Oct. 27, 1953 R. K. ILER 2,657,149
METHOD OF ESTERIFYING THE SURFACE OF A SILICA SUBSTRATE
HAVING A REACTIVE SILANOL SURFACE AND PRODUCT THEREOF
Filed Oct. 21, 1952 2 Sheets-Sheet 1
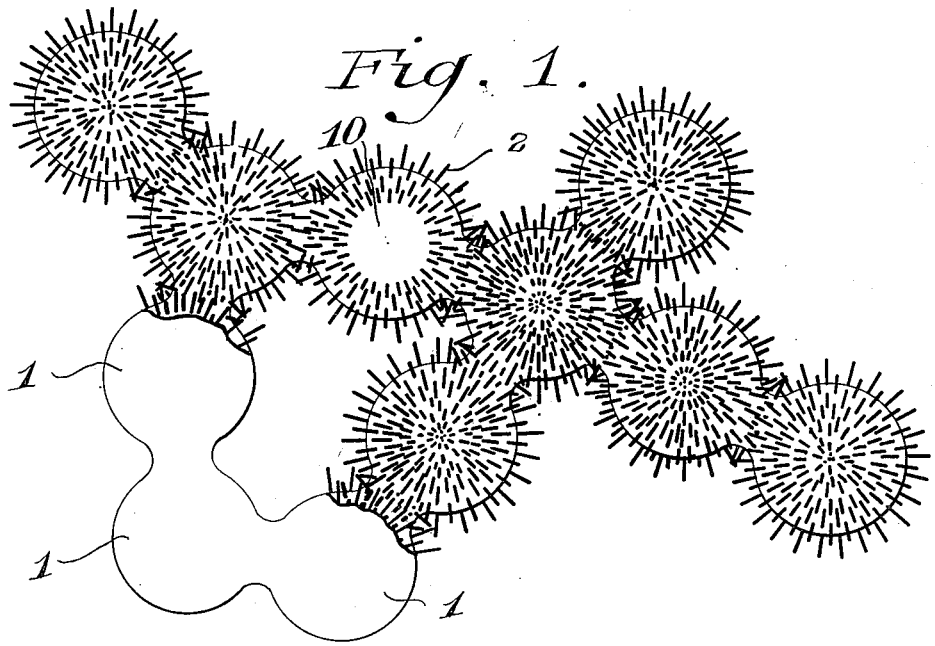
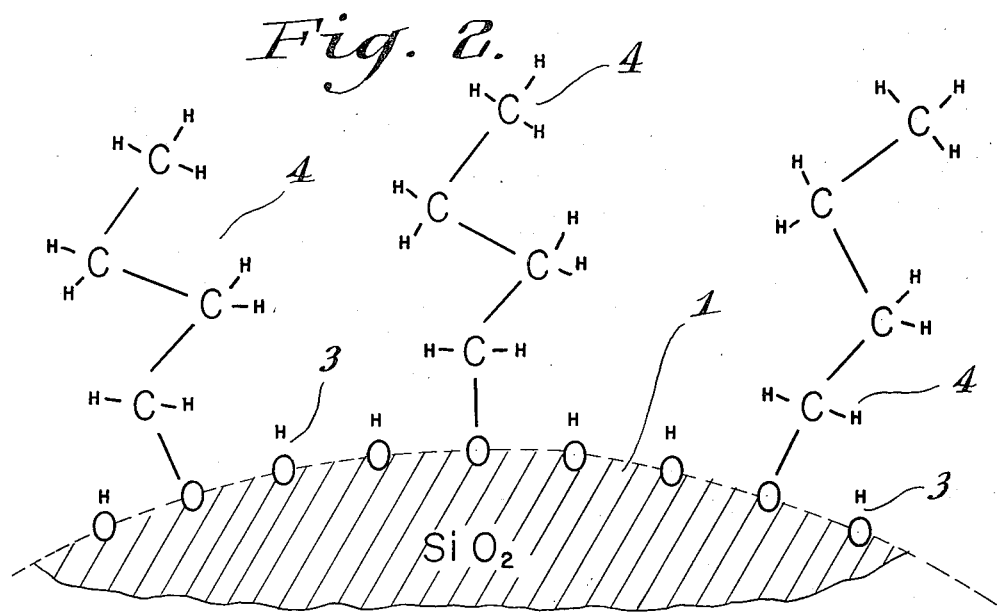
INVENTOR
Ralph K. Iler
BY Albert B. Griggs &
Fred C. Carlson
ATTORNEYS Oct. 27, 1953 — R. K. ILER — 2,657,149
METHOD OF ESTERIFYING THE SURFACE OF A SILICA SUBSTRATE HAVING A REACTIVE SILANOL SURFACE AND PRODUCT THEREOF
Filed Oct. 21, 1952 — 2 Sheets-Sheet 2

INVENTOR
Ralph K. Iler
ATTORNEYS

Patented Oct. 27, 1953

2,657,149

UNITED STATES PATENT OFFICE 2,657,149

METHOD OF ESTERIFYING THE SURFACE OF A SILICA SUBSTRATE HAVING A REACTIVE SILANOL SURFACE AND PRODUCT THEREOF

Ralph K. Iler, Brandywine Hundred, Del., assignor to E. I. du Pont de Nemours and Company, Wilmington, Del., a corporation of Delaware Application October 21, 1952, Serial No. 315,930

18 Claims. (Cl. 106—308)

This invention relates to organophilic, and preferably hydrophobic, products made up of a supercolloidal substrate which has a silica surface of high area and which is coated with —OR groups chemically bound to the silica surface, R being a hydrocarbon radical of at least two carbon atoms wherein the carbon atom attached to oxygen is also attached to hydrogen. The invention further relates to processes for making such products.

In the drawing:

Figure 1 shows an aggregate of substrate particles of the invention which are coated with —OR groups, Figure 2 is a diagrammatic illustration of a portion of the surface of one of the particles of Figure 1 in section.

Figure 3:
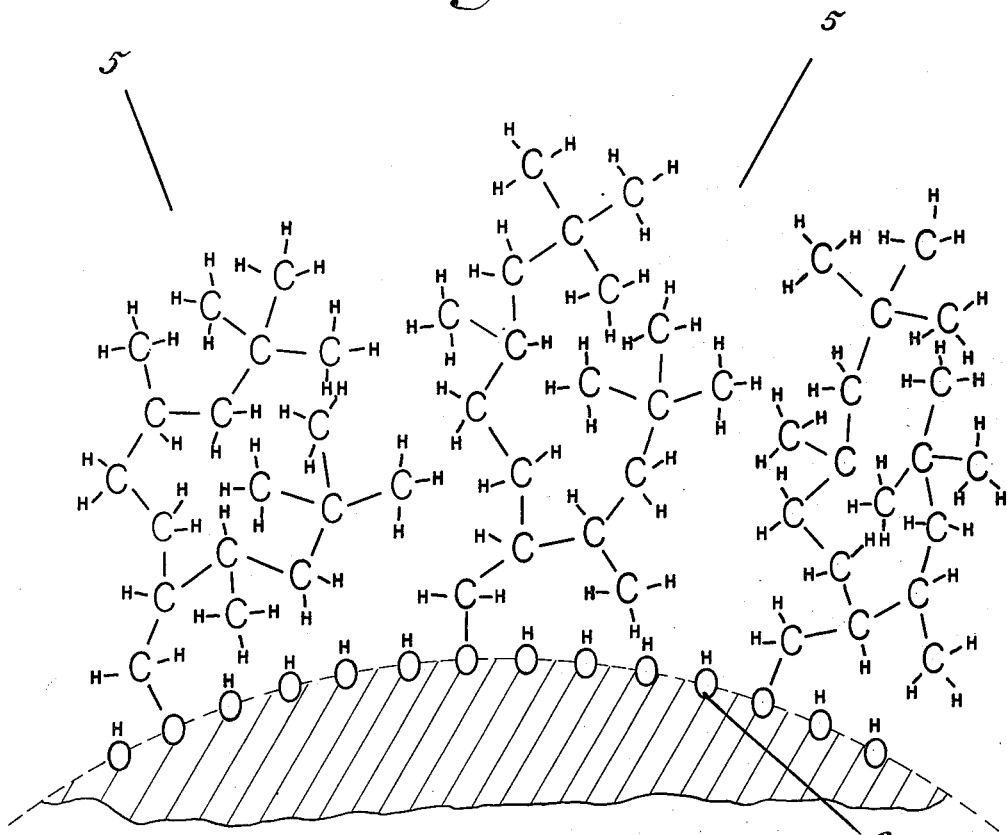
Figure 3 is a similar illustration of a modified particle, in section.

Referring to the drawings more specifically, there is shown in Figure 1 a substrate, 1. Upon this substrate there is a coating 2 of hydrocarbon groups. The substrate upon which the coating 2 is chemically bound is a network of spherical particles formed into a coherent aggregate, the coating being cut away on a few of the particles to show the manner in which the particles are bound together into the aggregate. The substrate has a high specific surface area. The coating 2 makes the product organiphilic or even hydrophobic.

The relation between the substrate and the coating is more clearly illustrated in Figure 2 which shows a specific embodiment of the invention. In Figure 2 the substrate 1 is amorphous silica. The surface of the silica is largely bounded by —OH groups 3. The silica surface is illustrated as chemically bound to butoxy groups 4.

The product as illustrated in Figures 1 and 2 is made as will hereinafter be shown by the reaction of butanol with the surface of the silica on a silica substrate of amorphous silica particles bound into aggregates.

Figure 3 illustrates a similar product in which a substrate 1 of silica is chemically bound, through oxygen, to branched-chain hydrocarbon groups 5. In particular, these groups are 5,7,7-trimethyl-2-(1,3,3-trimethylbutyl)-1-octyl groups. As in Figure 3 the —OH groups on the surface of the silica are designated at 3. The —OR groups of 18 carbons atoms which are attached to the silica surface are less numerous, in proportion to the —OH groups, than are the butoxy groups of Figure 2. This is because it requires less of the branched chain compounds to effect coverage as will be described hereafter.

Figures 4, 5:
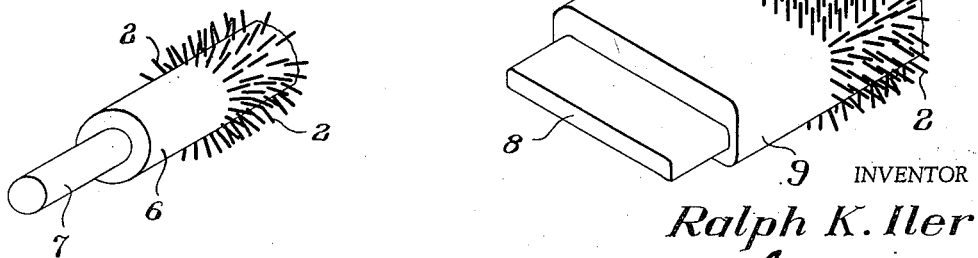
Figure 4 is a perspective view showing coated rod-like particles of a modified substrate of the invention, different portions of the typical particles shown being cut away.
Figure 5 is a similar view of a plate-like substrate coated according to the invention.

Figure 4 illustrates a modified product in which the substrate is a rod-ilke or fibrous material of high surface area. For example, the fiber may be chrysotile asbestos. The core of the fiber is illustrated at 7. This core of asbestos is surrounded with a surface of silica 6 formed or applied in manners which will hereafter be described. The organic coating 2 is chemically combined with the silica 6 and is an ester coating of the types hereinafter described.

Figure 5 shows a modification in which the substrate is in the form of finely divided plates. The substrate of Figure 5 is composed of a core 8. The core is a clay-like hectorite. Formed upon the platelets of hectorite 8, or applied thereto, is a silica coating 9. This coating is esterified with an alcohol to form a coating 2 as in the other embodiments illustrated.

THE MATERIALS ESTERIFIED

The supercolloidal substrate which is coated or esterified according to this invention is characterized by having a surface of silica and by having a specific surface area of at least one square meter per gram. The substrate forms the skeleton or internal structure of the products, as is illustrated in the drawings. The substrates are, of course, in the solid state.

It will be understood that for the purposes of this invention a hydrophobic or organophilic ester coating can be applied to any finely divided product which has at least a surface of silica. It is not important for the purposes of the reaction what material comprises the interior of the particles reacted. As a matter of fact it is ordinarily preferable to use a substrate which is composed of silica throughout or which is siliceous, but heterogeneous products can be used as will be described.

By a surface of silica is meant a layer of silica, that is, a solid silicic acid in any state of dehydration, more than one $SiO_2$ deep, so that the surface layer consists not only of the silicon atoms on the surface which are attached to the organic groups through an oxygen linkage, but also a sufficient depth of silica that the topochemical properties of the substrate are essentially those of a pure silica.

The substrates are in a supercolloidal state of subdivision, which means that whatever discrete particles are present are definitely larger than colloidal size. The discrete silica particles in a silica sol are necessarily of colloidal dimensions, else they would settle out as precipitates; hence the supercolloidal particles of the substrates with which this invention is concerned are larger than the particles to be found in a stable silica sol. The type of colloidal activity exhibited by the particles in a sol practically ceases when the particle size substantially exceeds about 100 millimicrons. As a practical matter, preferred supercolloidal substrates have at least one dimension of at least 150 millimicrons. The substrate may be made up of aggregates of ultimate units which are in the colloidal size range, provided such ultimate units are agglomerated into coherent aggregates of supercolloidal size.

A class of substrates of particular importance consists of inorganic siliceous solids having numerous pores, voids or interstices therein. These materials are porous, in that they have exposed surfaces in the interior of the lump or particle which are connected to the exterior so that liquids and gases can penetrate the pores and reach the exposed surfaces of the pore walls. Thus, the solid forms a three-dimensional network or webwork through which the pores or voids or interstices extend as a labyrinth of passages or open spaces. Especially preferred as substrates are porous inorganic siliceous solids having average pore diameters of at least four millimicrons.

Porous materials for use as substrates may be physically characterized by their bulk densities under known compressive loads. At three pound per square inch in excess of atmospheric pressure (p. s. i.) a 10 inch x ½ inch glass tube fitted with a flat fritted glass bottom was employed. A known weight of the silica is compressed by a stainless steel rod of known weight, acting on the surface of the silica through a porous glass plug resting on the surface. For measuring bulk densities of the siliceous materials under compressive loads of 78 p. s. i. and 1560 p. s. i., an accurately machined, hollow cylindrical, steel pill press was employed and pressure is applied through an accurately fitting solid, steel plunger by means of a hydraulic Carver laboratory press. From the known weight of the siliceous samples and the measured volumes under known compressive loads, the bulk densities can be calculated.

Representative of porous inorganic siliceous solids suitable as substrates are coherent aggregates of extremely small, non-porous, substantially spherical ultimate, amorphous, dried silica unit. A coherent aggregate is one in which the ultimate tiny units are so firmly attached to each other that they cannot be separated by suspension in fluid medium. Such an aggregate can be pulverized by grinding and attrition. When those aggregates are made up of ultimate units joined in a fairly open three-dimensional network, they are pulverulent and can be easily disintegrated to fine powders having particle sizes in the range of 1–10 microns. These powdery particles retain the porous or network structure. The ultimate units are chemically bound together by siloxane bonds (Si—O—Si) so that the coherent aggregates can properly be thought of as chemical compounds of high molecular weight.

Coherent aggregates of amorphous silica can also be considered to be gel structures. The term "coherent aggregate" includes conventional silica gel. However, it also includes materials so different from conventional silica gel that to call them gels would be misleading. In conventional silica gels the ultimate spherical units are always below 10 and usually below 5 millimicrons in diameter, and are so closely packed that the pores or interstices are very tiny. For many purposes, particles having utlimate units of 10 to 100 millimicrons average diameter, or ultimate units below 10 millimicrons diameter joined in very open networks (large pore size), are much more advantageous than conventional silica gels, and are preferred.

Since the coherent aggregates of porous inorganic siliceous solids have labyrinths of pores throughout their structures, and since the total exposed surface area of the pore walls in many times the exposed surface area on the external walls of said solids, the state of subdivision can vary widely without much change in the total exposed surface area of a given mass. For the purposes of this invention, if there is a proper amount of surface area for a given mass of inorganic siliceous solid, then it is technically immaterial whether the solid is in pieces the size of a baseball or larger or is comminuted to a fine powder. However, there is a practical maximum particle size, because in very large masses of substrate, for example, several inches in diameter, diffusion of the esterifying agent and water through the pores takes place very slowly and this may make the esterification process impractical. It is therefore preferred to have the supercolloidal particles in a relatively finely divided condition. Ordinarily, this means that the supercolloidal particles should be sufficiently fine to pass through, for example, a screen having 100 meshes per linear inch. Particles this small are powders. Powders are preferred.

The inorganic siliceous solids used as substrates have large surface areas in relation to their mass. The relationship of surface area to mass is called the "specific surface area" and is expressed as square meters per gram ($m.^2/g.$). As used in this application, specific surface area is expressed numerically in $m.^2/g.$ as determinable by nitrogen adsorption.

According to this invention there is a minimum specific surface area below which no important contribution is made by surface esterification. This threshold value is about 1 $m.^2/g.$ For inorganic siliceous solids subdivided into essentially spherical non-porous particles, this corresponds to an average particle diameter of about 2–3 microns. The specific surface area becomes quite significant at about 25 $m.^2/g.$ This corresponds to a particle diameter of about 100 millimicrons for essentially spherical non-porous particles.

Precipitated amorphous silica is one of the preferred substrates surface-esterified according to this invention.

It is preferred to use amorphous silica in the form of supercolloidal aggregates in which the pores or spaces between the ultimate units have an average diameter, as determined from nitrogen adsorption curves, of at least 4 millimicrons. When the pores are smaller than this, the higher alcohols, particularly the $C_{18}$ straight chain alcohols in which the molecule is around 2 millimicrons in length, penetrate the pores with difficulty, and when attached to the exposed surface of the pore walls must fill them almost completely.

Pore volumes may be determined from the nitrogen adsorption isotherms, as described by Holmes and Emmett in Journal of Physical and Colloid Chemistry, 51, 1262 (1947). The pore diameter values are obtained by geometric calculation from an assumed cylindrical pore structure.

The dried aggregates or gels in which the average pore diameter is smaller than about 4 millimicrons can still be reacted with alcohols to cover the external walls and most of the internal walls of the supercolloidal aggregates with ester groups, but if the substrate structure is broken apart by extreme grinding, the freshly formed hydrophilic silica surfaces formed by fracturing the aggregate structure amount to such a high percentage of the total final surface that the disintegrated product has a relatively large proportion of unesterified surface.

On the other hand, where the supercolloidal aggregates have a looser structure and contain pores of at least about 4 millimicrons average diameter, the surface is easily accessible to alcohol, and the structure is ordinarily weaker, mechanically. These coarser pores may be the result of a much looser packing of small ultimate units which may be, for example, 5 to 10 millimicrons in diameter, or the pores may be large due to the fact that the ultimate units are larger, for example 20 or 30 millimicrons in diameter, and therefore the spaces between the ultimate spherical units are naturally larger even in closely packed structures.

The ultimate spherical units constituting the preferred substrates are preferably quite uniform in size. Ultimate units having diameters smaller than about 5 millimicrons can become packed so closely together as to have pores below the minimum preferred size. Hence, preparation of such aggregates requires special care. Spherical units having diameters larger than about 100 millimicrons have specific surface areas less than about 25 m.$^2$/g., and are not preferred. Where the coherent aggregates have ultimate units of about 5 to 100 millimicrons average diameter, pore size problems are minimized. This, then is a preferred type of material to be esterified. Finely divided silica powders of this type consisting of ultimate units 15 to 100 millimicrons in diameter, linked together to form supercolloidal coherent aggregates, offer advantages as substrates since such powders are especially easy to filter and process; on the other hand, substrates of this type having ultimate units 5 to 15 millimicrons in diameter are very difficult to disperse in organic systems such as elastomers and plastics, whereas after esterification the dispersibility is remarkably improved.

Units in the size range of 5 to 100 millimicrons can be observed in the electron microscope, and the average unit diameter determined by direct measurement. However, in the electron microscope it is impossible to tell whether the units are linked directly together through a coalescence (siloxane linkage) of the units to a greater or less degree, or whether the units are separate and discrete particles lying together only in loose contact. If the latter is the case, the units may be readily re-dispersed in fluid medium to a colloidal state, and the silica does not, therefore, consist of coherent, supercolloidal aggregates. On the other hand, in the case of the coherent aggregates of the type which may be esterified by the process of this invention, the ultimate units are linked together through primary chemical bonds in the form of siloxane linkages. The degree to which the silica units are linked together or coalesced will be described hereinafter.

The electron microscope is particularly well adapted to the determination of apparent specific surface area, particle size and shape, particle size distribution, and degree of dispersion and flocculation or aggregation in any finely divided material which has ultimate particles in the size range of a few microns to about 5 millimicrons. The method used in mounting the sample for observation under the electron microscope in a manner which will insure an accurate representation of the material and avoid changes due to the process of examination, the method for measuring particle sizes from projected images of electron microscopic photographs, and statistical methods for determining the mean diameters and mean specific surface areas from the particle count data are described in detail by J. H. L. Watson in Analytical Chemistry, 20, p. 576 (June 1948).

Nitrogen adsorption provides an accurate method for determining the specific surface area and pore volume of the substrate. Since the nitrogen molecule has a diameter of less than 0.5 millimicron, it can penetrate essentially all of the pores of the substrates and is readily absorbed by all the exposed surfaces. A method for measuring specific surface areas by nitrogen adsorption is given in an article "A new method for measuring the surface areas of finely divided materials and for determining the size of particles" by P. H. Emmett in the publication, Symposium on New Methods for Particle Size Determination in the Sub-Sieve Range, published by the American Society for Testing Materials, March 4, 1941, p. 95. The value of 0.162 square millimicron for the area covered by one surface adsorbed nitrogen molecule is used in calculating the specific surface areas. These are expressed in square meters per gram, m.$^2$/g.

The above-described electron microscope observation and nitrogen adsorption techniques may be used in various ways to define the substrates employed and products produced according to this invention. In particular, they may be used to determine the degree to which the ultimate unit particles of a siliceous aggregate are linked together. Assuming that each ultimate unit observed in the electron micrograph is a separate and distinct particle, not linked chemically to other particles, the specific surface area of the silica is calculated, using 2.2 g./cc. as the density of the ultimate units. Then the specific surface area is determined by nitrogen adsorption. In the case of silica units which are united together, or coalesced, to form coherent aggregates, the specific surface area calculated from electron micrographs is greater than the specific surface area as determined by nitrogen adsorption, since some of the apparent surface area of the units is taken up by the direct points of contact with adjacent particles. The degree to which the units are coalesced may be expressed by the coalescence factor $S_c/S_n$, where $S_c$ is the surface area calculated from the electron micrograph, and $S_n$ is the surface area as determined by nitrogen adsorption.

With perfectly smooth units which are not coalesced $S_c/S_n$ would be 1.0. However, in actual practice, in finely divided silicas in the size range of 5 to 100 millimicrons, this factor is approximately 0.8 for noncoalesced particles, probably because the surface of the particles contains small irregularities and indentations not visible in the electron microscope. Where the units have average diameters of 15 millimicrons or greater, and a coalescence factor greater than about 0.9, and particularly where this factor exceeds about 1.0 as determined by actual experiment, the units are present in the form of firm, coherent aggregates.

Large coherent aggregates having values of $S_c/S_n$ higher than about 1.3 are so strong that the material is difficult to comminute. In one preferred aspect of this invention powders having an ultimate unit average diameter range of 15 to 30 millimicrons and a coalescence factor of 0.9 to 1.3 having a specific surface area in the range of about 50 to 175 m.$^2$/g. are recovered directly from water in the form of supercolloidal aggregates and remain soft, light, smooth-feeling powders which are readily rendered hydrophobic by surface-esterification.

When the specific surface area exceeds about 200 m.$^2$/g., the surface of the material contains a relatively large proportion of the total number of silicon atoms present. In the case of a precipitated silica having a surface area of 200 m.$^2$/g., more than 10% of all the silicon atoms are on the surface of the extremely small, dense, ultimate units of silica in the aggregate. With such substrates very marked physical effects are brought about by surface modification. For example, in the thickening of oils and organic coating compositions with fine silica having a specific surface area of over 200 m.$^2$/g., the improvement in properties brought about by esterification becomes very important. Surface esterification also prevents shrinkage during drying from a liquid of such high-surface-area substrates, whereas without esterification the substrates shrink substantially.

Precipitated amorphous silicas having specific surface areas in the range of about 200 to 400 m.$^2$/g. can be obtained as supercolloidal aggregates in a dry state from water without any considerable collapse of the porous structure by replacing the water with a water-miscible organic solvent such as acetone and then drying. This powder is especially suitable for subsequent esterification. Similarly, very voluminous aerogels having surface areas from 200 to 900 m.$^2$/g. may be produced by processes of the prior art and these highly porous forms of silica can be surface-esterified by processes of this invention.

The external walls of dense, extremely finely pulverized, glassy silica gel may also be esterified by processes of this invention. Such gels have a specific surface area as high as 900 m.$^2$/g., mostly as the walls of tiny pores less than 4 millimicrons in average diameter. However, in such compact structures, which cannot readily be further comminuted, a part of the esterifying agent is trapped within the tiny pores and does not contribute to the organophobic or hydrophobic character of the exposed surface. Nevertheless, the ester groups on the external walls of such particles renders the surface organophilic or hydrophobic.

For a further comprehension of types of silica which may be esterified according to the present invention, it is important to understand the chemical changes which occur when silicic acid goes to silica gel or hydrated silica. These changes are well described in the book "Natural and Synthetic High Polymers" by K. H. Meyer (1942) at p. 85.

A further excellent description of the polymerization reaction is found in "Chemical Reviews," vol. 22, No. 3, June 1938 in an article by Charles B. Hurd at p. 403; and especially at p. 405.

A silica which is in the form of very small, discrete particles having a gel structure within the particles and which may be esterified is described in my parent application Serial No. 590,728, filed April 27, 1945, now abandoned. This is prepared by reacting sodium silicate and an acid at a pH below 3.0 to give a silica sol, polymerizing the silicic acid in the sol sufficiently to make the sol viscous, mixing an organic hydrogen bonding donor compound, such as tertiary butyl alcohol, with the sol, dissolving salt in the mixture, whereby a phase separation occurs giving a hydrogen bonder phase containing the silicic acid and an aqueous brine phase, and polymerizing the silicic acid further in the bonder phase until hydrated silica is precipitated in the form of discrete particles. The precipitated silica is separated from its mother liquor and washed free of salt.

The wet precipitate, after separation from the precipitation medium, consists of finely divided, hydrated silica in the form of coherent aggregates. In thin layers it is translucent, almost transparent, and very slippery to the touch. When water is removed from the product by mechanical means such as filtration, a mass having the consistency of a heavy grease can be recovered, and in contrast to massive silica gel it is easily resuspended in water by mechanical agitation to form a smooth suspension of coherent aggregates of supercolloidal size which are not further aggregated into lumps.

The individual particles of the wet silica precipitate have reactive hydroxyl groups upon their surfaces. When the particles are dried down, these groups unite with each other and the product becomes a rigid, hard mass resembling dried silica gel. This mass may be ground to a fine powder and it may be activated in a current of hot, dry air. When so activated it has a high adsorptive capacity for water vapor.

The silica substrates prepared as described above may be esterified according to a process of this invention, either as the wet filter cake or as the dried, finely ground powder. The wet cake may be dried in an oven, or the water may be removed by adding an organic hydrogen bonding donor compound which forms an azeotrope with water, such as tertiary butyl alcohol, and distilling off the water, as described in my application Serial No. 590,728.

Silicas precipitated in the form of finely divided, discrete particles by various other methods may also be esterified according to the present invention. Recently, examination of some of these precipitates under the electron microscope has indicated that they have structures which, though non-crystalline, are nevertheless capable of considerable definition. By examining the profile of a piece of silica gel, for instance, it is possible to discern groups of ultimate, substantially spherical, units having diameters as small as three to five millimicrons. By supplementing the electron micrograph data with data obtained by measuring the nitrogen adsorption, a substantial definition of the material is possible.

To produce a porous, amorphous silica solid made up of coalesced, relatively large (15–130 millimicron diameter), dense, substantially spherical ultimate units, the ultimate units can be prepared first and then coalesced and precipitated to form the desired porous amorphous silica solid. These ultimate units may be produced by build-up on the particles in a silica sol as disclosed in Bechtold and Snyder U. S. Patent 2,574,902. The ultimate units can then be coalesced into supercolloidal particles and precipitated from the sol by the addition of a salt such as sodium sulfate or a polyvalent metal salt. If the amount of cation retained by the silica is substantial, it may be removed from the precipitated product by an acid wash or by cation exchange.

The precipitation above-described is the subject of Alexander et al. applications, Serial Nos. 99,351 and 99,353, both filed June 15, 1949.

The silica may also be precipitated by adding a long-carbon-chain nitrogen compound such as a long-chain amine or a long-chain quaternary ammonium compound, as described in my application Serial No. 99,355 filed June 15, 1949. Representative of the quaternary compounds are cetyl trimethyl ammonium bromide, lauryl pyridinium chloride, lauryl trimethyl ammonium chloride, and similar compounds.

Dense ultimate silica units comparable in character to those described above may be prepared by adding an acid such as sulfuric to a hot (above 60° C.) solution of sodium silicate. The addition is conducted over a period of time. The sodium ion concentration in the solution must not exceed 0.3 normal. The units thus formed can be coalesced to porous supercolloidal particles and precipitated from the solution by methods as above described. The details of a typical preparation of a particulate silica suitable for esterification according to the present invention are described in my copending application Serial No. 99,349 filed June 15, 1949.

A product of the type just described may also be prepared as described in Alexander et al. U. S. Patent 2,601,235.

It is not necessary to maintain the ultimate units as separate entities until the precipitation step. They can be coalesced while being generated in diulte solution. Such products suitable for esterification according to the present invention can be prepared by any of the processes described in an application by Alexander, Wolter, and myself, Serial No. 244,722, filed August 31, 1951. Briefly, these materials can be prepared by mixing an aqueous dispersion of active silica with coalesced aggregates consisting of a plurality of amorphous, dense, ultimate silica units and heating the mixture above 60° C. at a pH of 8 to 11, whereby the active silica accretes to the coalesced aggregates. The dispersion of active silica can conveniently be prepared by adding sodium silicate and acid simultaneously to an aqueous dispersion of aggregates. The aggregates may be prepared by adding carbon dioxide gas to a sodium silicate solution heated to a temperature of 95° C., the addition being completed over a period of about forty minutes. The $CO_2$:$Na_2O$ mol ratio should be about 1.2 and the pH of the sol around 10. The sol thus prepared can serve as a heel to which carbon dioxide gas and sodium silicate solution are added simultaneously with agitation and at a temperature of about 95° C. The quantity of $SiO_2$ in the feed solution should be about four parts for each part of $SiO_2$ originally present in the heel. The silica nuclei which are built-up by this process will serve as nuclei for the build-up of the coalesced aggregates using active silica as above described. Aggregates prepared in various manners also may be used, so long as they are in finely divided, particulate form.

An especially practical adaptation of the procedure just described consists in reinforcing the structure of precipitated silica in particulate form by accreting active silica thereto. Such products may more readily be dried without collapse of the gel structure to give particles of very low bulk density. Both these products, and the corresponding products in which the original ultimate units in the aggregates before reinforcement were larger than those in a gel, can advantageously be dried by adding an organic liquid such as tertiary or normal butyl alcohol and azeotropically distilling out the water. The details of such a process are described in the above-mentioned application Serial No. 244,722.

Another type of substrate suitable for esterification by a process of this invention consists of particles having an external coating or layer of amorphous silica upon an internal core of another material. Such products may be made by depositing active silica upon nuclei of the heterogeneous substance by treating sodium silicate with an acid in the presence of the core materials, as described above and more fully set forth in my application Serial No. 252,965, filed October 24, 1951. Colloidal clays, glass fibers and other metal silicates, titania pigments, and the like may serve as cores, the ultimate, coated particles being of supercolloidal size.

Another suitable form of a hydrated amorphous silica powder which may be used as a substrate is one characterized as consisting of supercolloidal aggregates of ultimate units of from 10 to 50 millimicrons in diameter, described in Chemical Engineering 54, 177, (1947), produced by the Linde Air Products Company. It has a specific surface area of about 240 sq. meters per gram and a bulk density of about 0.064 grams per cc. at 3 p. s. i.

A further form of amorphous silica which may be used as a substrate is an aerogel having a specific surface area of about 160 m.$^2$/g. as determined by nitrogen adsorption, and a bulk density of about 0.087 gram per cc. at 3 p. s. i. g. and marketed as "Santocel C" by the Monsanto Chemical Co.

Still another form of amorphous silica substrate is a powder consisting of supercolloidal aggregates of ultimate units having an average diameter of about 25 millimicrons, a surface area of about 100 m.$^2$/g., and containing a small amount of calcium (1 to 2% by weight), marketed by the Columbia Chemicals Division of the Pittsburgh Plate Glass Company as "Hi-Sil."

Yet another form of amorphous silica powder substrate consists of supercolloidal aggregates having a surface area of about 210 m.$^2$/g. and obtained from Germany under the trade name of "K–3".

It is well known that silicas prepared by various methods may be treated with heavy metal salts or hydrous heavy metal oxides to prepare heavy metal silicates which are water-insoluble, and usually amorphous as determined by X-ray examination. These metal silicates may be prepared from any of the special types of silica whose preparation is disclosed above, by treatment with significant amounts of metal salts. They can be prepared so as to have a large number of silanol (—SiOH) groups on the surface of the particles, and consequently may be esterified by the methods of this invention. Metal silicates having a large proportion of metal ions on the surface may be activated for esterification by washing with acid to remove these surface metal ions and leave surface silanol groups. Thus, for example, one may so treat a precipitated hydrated calcium silicate, having a molar ratio of $SiO_2/CaO$ equal to about 3.25, containing aggregates of ultimate particles of the order of 30 to 50 millimicrons in diameter, described in Chemical & Eng. News 24, 3147 (1946), and marketed as "Silene EF" by the Columbia Chemicals Division of the Pittsburgh Plate Glass Co.

Crystalline metal silicates, occurring in nature as silicate minerals, may also serve as substrates for esterification. These metal silicates are highly hydrophilic, since their surfaces contain silicon-oxygen groups, silanol groups, and metal hydroxide groups. The surface silanol groups on the mineral particles may be esterified by the processes of this invention. However, the proportion of surface silanol groups on most of the minerals is small, so that a degree of esterification necessary to render the particles organophilic can not ordinarily be attained with the natural, unmodified minerals. To increase the number of surface silanol groups metal ions may be replaced or exchanged for hydrogen ions by washing with dilute acids or treating with ion-exchange resins. To produce a still larger proportion of surface silanol groups, the crystalline mineral particles may be more vigorously treated to remove metal ions from their basic chemical structures. Reaction with acids at low pH and at temperatures above 30° C. may be used. Although it is only necessary to remove metal ions from the surface layer of the particles, the process may be extended, for example, by increasing the concentration of acid, the temperature, or the time of treatment, until any desired amount of the metal ions, or indeed essentially all of the metal ions, have been removed.

Crystalline silicates to be used in substrates for esterification should be in a sufficiently finely divided condition that they have a surface area of at least 1 m.$^2$/g., and preferably larger than 25 m.$^2$/g. A large number of the silicate minerals may be readily reduced to regularly shaped ultimate crystallite units which are supercolloidal in one or more dimensions, but which also have one or more dimensions less than 0.5 micron or even less than 0.1 micron. Thus, for example, the asbestos type minerals may be readily reduced to long, thread-like or fibrous particles less than 0.1 micron in diameter and with lengths ranging from 0.5 micron to as much as several inches.

Asbestos minerals which may be employed as substrates include: chrysotile asbestos and serpentine, and amphiboles such as crocidolite asbestos, amosite, tremolite, and anthophyllite. Clay minerals which are useful as substrates have a rod- or needle-like, a lath-like, or a plate-like structure. Clays which have needle-like particles include halloysite and attapulgite. Lath-like clays include hectorite and nontronite. The two main classes of plate-like clays are the kaolins, which include kaolinite, nacrite, and dickite, and the bentonites, which include beidellite, saponite, and montmorillonite. The micaceous minerals are also plate-like in nature, and may be used as substrates. They include phlogopite, muscovite, biotite, and vermiculite.

The minerals may be reduced to their ultimate crystalline units for use in this invention by dry milling, wet ball milling, colloid milling in a solvent, or similar known methods. These milling methods, however, would not be capable of producing the desired fine particles with elongated shapes were it not for the fact that the minerals are built up of the ultimate crystallite units held together in an orderly fashion, and that these are merely disoriented, separated, and dispersed by the milling.

In addition to the natural crystalline silicate minerals, it is also possible to synthesize crystalline metal silicates in contrast to the amorphous metal silicate precipitates and gels mentioned above. These synthetic crystalline metal silicates are usually produced by high temperature fusion methods, or by high temperature, high pressure, hydrothermal methods. In order to esterify these synthetic crystalline silicates, they must be surface-modified to introduce silanol groups by methods such as acid-treatment or coating with amorphous silica as described above.

THE ESTERIFYING AGENT.

The esterifying agents used in processes of this invention are primary and secondary monohydric alcohols. Thus, they are compounds of the formula ROH, wherein R is a hydrocarbon radical wherein the carbon attached to oxygen is also attached to hydrogen.

Examples of compounds of this class are normal straight chain alcohols such as ethyl, n-propyl, n-butyl, n-amyl, n-hexyl, n-heptyl, n-octyl, n-nonyl, n-decyl, n-undecyl, n-dodecyl (lauryl), n-tetradecyl (myristyl), n-hexadecyl (cetyl), and n-octadecyl (stearyl); branched chain primary alcohols such as isobutyl, isoamyl, 2,2,4-trimethyl-1-hexanol and 5,7,7-trimethyl-2-(1,3,3-trimethylbutyl)-1-octanol; secondary alcohols such as isopropyl, sec-butyl, 2-pentanol, 2-octanol, 4-methyl-2-pentanol, and 2,4-dimethyl-3-pentanol. Examples of alicyclic alcohols are cyclopentanol, cyclohexanol, cycloheptanol, and menthol. Examples of alcohols of the class having ethylenic unsaturation are allyl, crotyl, oleyl (cis-9-octadecen-1-ol), citronellol, and geraniol.

Acetylenic unsaturation is illustrated by propargyl alcohol. Araliphatic alcohols are illustrated by benzyl, 2-phenylethanol, hydrocinnamyl, and alpha-methyl-benzyl. Cinnamyl alcohol is an example of an alcohol containing both aromatic and ethylenic unsaturation.

When saturated primary and secondary alcohols are used as the esterifying agents the resulting ester groups are, of course, alkoxy groups.

The saturated primary alcohols are especially useful because they react more readily and at lower temperatures than do secondary alcohols and are more stable than unsaturated alcohols at the temperatures of the reaction. On the other hand, for certain uses, such as incorporation of the esterified silica as a reinforcing filler in certain organic polymers, the silicas esterified with unsaturated alcohols are especially useful since subsequent treatment results in copolymerization of the unsaturated —OR groups on silica with active unsaturated linkages in the partially polymerized organic polymer.

Technically, there is no upper limit to the number of carbon atoms which may be present in the esterifying agent. As a practical matter, the group of alcohols having 2 to 18 carbon atoms include the majority of known monohydric alcohols and offer a selection of organic molecule sizes which should be adequate for any purpose. The alcohols having from 3 to 6 carbon atoms are also especially preferred because they are relatively low boiling liquids which are most readily handled in the process, and when present as unreacted excess can be most readily removed from the esterified product by drying in a vacuum oven without the necessity of extraction procedures. They are also the most economical to use, and yield a product having a low ratio of organic matter to silica which is very desirable for certain uses.

Mixtures of alcohols can be used as the esterifying agent.

THE ESTERIFICATION PROCESS

Processes of the present invention comprise the step of chemically reacting an alcohol of the formula ROH in which R is a hydrocarbon radical having at least 2 carbon atoms, wherein the carbon atom attached to oxygen is also attached to hydrogen, with an inorganic siliceous solid as described previously, while maintaining the water content of the system below about 5% by weight of the alcohol in the system.

To have a water content below 5% by weight at all times, one must not only start with this relatively low proportion, but must also maintain it during the course of the reaction, by removing water if necessary, water being one of the reaction products formed.

When the substrate is in the form of a wet mass such as a filter cake, it is necessary to remove the free water, either before the substrate is put into the alcohol, or by distillation after the wet substrate is mixed with the alcohol.

If the substrate is a type which does not shrink to a hard compact mass upon drying from water, ordinary drying means may be employed, vacuum drying in some instances being preferred. But if the substrate shrinks or otherwise changes under ordinary drying, a preferred method is to displace the water with a polar organic solvent, which if desired may later be recovered by evaporation and recycled. For example, a wet filter cake of finely divided precipitated silica may be washed thoroughly with acetone to displace the water, and the acetone-wet mass may be dried directly to a soft powder, which is more voluminous and easily suspended in alcohol than it is when dried directly from water. Such a water displacement may be operated as a continuous extraction, in which efficiency can be improved by counter-current methods.

Azeotropic distillation is a preferred method of removing water from wet substrates. The water-wet substrate can be mixed with a polar organic liquid, such as methyl ethyl ketone, and the mixture distilled until the system is free from water, leaving the siliceous solid in suspension in anhydrous organic liquid. The organic liquid may then be evaporated to give a dry product for reaction with alcohol. The alcohol, which is later to be used for esterification, may also be used as the azeotropic dehydrating agent. For example, the filter cake can be mixed with normal butyl alcohol and water may be distilled off as the normal butyl alcohol azeotrope. This azeotrope, upon condensation and cooling, splits into an alcohol-rich layer and a water-rich layer. The alcohol-rich layer is returned to the distillation pot, while the water-rich layer is removed from the system, stripped of alcohol by further distillation, and the water discarded.

The type of organic liquid used, and the particular methods of drying or of transferring to the alcohol reaction mixture depend upon the type of silica involved, and the type of product desired.

Generally, those forms of silica or silicates which form dense, hard masses when dried from water, are preferably dehydrated by washing or extraction with a water-miscible organic liquid having a water-rich azeotrope, such as normal propyl alcohol. Where shrinkage to dense but friable masses occurs upon drying from water, azeotropic dehydration can be carried out with organic liquids which are only partially miscible with water, such as normal butyl alcohol. Where shrinkage of the substrate upon drying from water is not a serious factor, but the finely divided state of the powder makes it difficult or undesirable to dry by ordinary means the azeotropic dehydration may be carried out by distillation with a water-immiscible liquid such as kerosene.

The presence of extraneous materials, other than water, is also to be avoided. Strong acids, and alkalis are particularly undesirable because they affect the stability of the reactants and products. Washing will remove such soluble extraneous materials. Any remaining strong acid or alkali can be rendered relatively harmless by adjusting pH to the range of 2 to 9 and preferably to the range of 5 to 8.

Having conditioned the substrate for esterification by drying it and removing extraneous matter as just described, there is added to the substrate sufficient alcohol to provide a sufficiently high concentration of alcohol in contact with the substrate to facilitate a practical rate of reaction. The reaction rate is much more rapid when the alcohol is in the liquid state, and therefore usually sufficient alcohol is used to provide a liquid alcoholic medium. Not all of the substrate need be in contact with the liquid alcohol phase at any one time; for example, a moist mass of silica wetted with alcohol may be heated with continuous mixing under conditions such that some of the silica is in contact with liquid alcohol. The preferred procedure is to have sufficient liquid alcohol present to wet all of the siliceous material which is to be reacted. For mechanical reasons, sufficient alcohol is usually used to provide a slurry which can be readily stirred.

Unless water is removed from the system during the reaction, the water content of the system is increased during the esterification by water of reaction and may exceed 5% unless sufficient anhydrous alcohol is added, either before or during the reaction step. The preferred procedure of operating under atmospheric pressure is to remove water continuously by azeotropic distillation during the reaction, and thus keep down the water content.

To obtain organophilic products, the water content of the alcohol in the system at the end of the reaction period should not exceed about 5%, based on the weight of water in the liquid alcohol phase, and excluding the weight of siliceous material in suspension. The water content can be readily determined by filtering out the siliceous material and determining water in the filtrate by titration with Fischer reagent.

To produce hydrophobic products, the water content of the alcoholic medium at the end of the reaction should not exceed about 3% by weight.

For maximum esterification, i. e., to produce products having practically no absorption capacity for methyl red from benzene solution, it is necessary to maintain the water content of the liquid phase of the reaction mixture below about 1.5% by weight. In fact, it is desirable to keep the water content as low as possible at all times.

The limits on water content just mentioned should be observed over a period of time sufficient to attain practical equilibrium within the system. It is not sufficient to heat the siliceous solid with alcohol over a period of time at a substantially higher water content and then reduce the water content below the maximum values just at the end of the reaction. Rather, the system should be maintained with a water content below these values for sufficient time at the reaction temperature to insure that the reaction has proceeded as far as it will go under those particular conditions of time, temperature, pressure, and water content.

The esterification reaction is facilitated by heating the substrate with the alcohol at an elevated temperature. There is a definite time-temperature relationship for this reaction but at any given temperature the practical extent of reaction is fixed more by the temperature than by the time—that is, it proceeds quite rapidly up to a certain point which is characteristic of the temperature and of the alcohol, and thereafter proceeds only very slowly. Thus, for example, the extent of reaction readily obtainable at 130° C. can be obtained at 100° C. only by using an extremely long reaction time and for practical purposes the attainable extent of reaction at 100° C. is much lower than at 130° C.

The minimum reaction time and temperature required to obtain a given extent of reaction varies also with the type of alcohol used. Short chain primary alcohols react somewhat more rapidly than long chain alcohols and, in general, primary alcohols react more rapidly and more completely at a given temperature than secondary alcohols. The rate and extent of reaction are related to the shape of the alcohol molecule employed, the longer alcohols and the more highly branched alcohols and particularly the secondary alcohols, representing varying amounts of steric hindrance.

The following table indicates the temperature required for the preparation of a given type of product within a practical reaction time such as one or two hours. This assumes that during this reaction time the water content of the system is maintained below 1.5%. One skilled in the art may learn from the data the general principles involved, and conclude what conditions should be used for any other alcohol.

*Process temperatures for 1 hr. reaction time*

| | Primary alcohols, degrees C. | Secondary alcohols, degrees C. |
|---|---|---|
| Organophilic | 110 | 130 |
| Hydrophobic | 118 | 225 |
| Zero methyl red dye adsorption | 190 | 275 |

When temperatures substantially below about 100° C. are used, alcohol can be strongly adsorbed to the siliceous surface but true esterification is not obtained.

The maximum temperature of the reaction is limited only by the stability of the alcohol and of the product against thermal decomposition. However, it is unnecessary to heat up to the critical point of the alcohol since the reaction proceeds satisfactorily at lower temperatures. Because of the general instability of alcohols at high temperature, it is preferred not to prolong the heating of the reaction mixture any more than necessary to achieve esterification equilibrium.

After the desired equilibrium has been reached, the solid esterified product may be removed from the excess alcohol by filtration. Alternatively, vacuum may be applied to the reaction vessel, removing the alcohol rapidly by vaporization. Alcohols which distill readily at atmospheric pressure without decomposition can be removed from the esterified product simply by distillation, or by drying in an oven, fitted, for example, with a vapor recovery system.

Where the esterification reaction is carried out under pressure, it is most convenient to vent the excess alcohol as vapor while the reaction vessel is still under high temperature and pressure. While it is possible to heat the reaction mixture under pressure to above the critical point, and then vent to remove the alcohol from the product without having liquid phase present, there is ordinarily no advantage in such a procedure, and in fact, the temperature conditions required for such operation are often so high as to result in decomposition of the alcohol and of the reaction product. The preferred method is to heat the siliceous material under pressure with the alcohol only long enough to complete the esterification reaction, which usually requires less than one hour and often only a few minutes, and then release the alcohol vapors with continued application of heat to the vessel to complete the vaporization of the liquid alcohol. Then the vessel is flushed with inert gas to remove the remaining alcohol vapors, or a vacuum is applied for the same purpose, to obtain an alcohol-free esterified product.

Since the higher alcohols are not readily distilled except under very high vacuum, it is more convenient to remove an excess of such an alcohol by extracting it with a low boiling solvent such as methyl ethyl ketone, chloroform, or ether. The surface-esterified siliceous solid can be separated from the extraction medium readily by filtration or centrifuging. After the higher alcohol has been completely removed, the solvent may be evaporated from the product, leaving a dry powder.

Instead of removing excess alcohol after the reaction, part or all of the alcohol can be left in the products for some uses and additional quantities of alcohol or other liquids can be added without drying the products. Thus, an esterified product can be incorporated as an alcoholic slurry directly into liquid or solid compositions of matter, so that the esterified product is never recovered in the dry state. Also the products can be compressed from the alcoholic slurry, either with or without the addition of a binder, to give pellets, bricks, or other shapes or forms of solids. It will, therefore, be understood that modifications of this kind or their equivalents, are within the spirit and scope of the invention.

THE ESTERIFIED PRODUCTS

The esterified products of this invention comprise a supercolloidal substrate, that is, a substrate in the form of particles larger than colloidal size, coated with —OR groups, the substrate having a surface of silica and having a specific surface area of at least 1 square meter per gram, the coating of —OR groups being chemically bound to said silica and R being a hydrocarbon radical of at least 2 carbon atoms wherein the carbon atom attached to oxygen is also attached to hydrogen. These products I have called "estersils."

In physical appearance the products are powders, although in some instances they may be in the form of lumps or cakes which usually are pulverable under the pressure of the fingers or by light rubbing action. In some instances the products are obtained directly in the form of exceedingly fine, light, fluffy, voluminous powders, some of which are so mobile and free-flowing that they behave very much like fluids. The coherent aggregates or particles are so small and soft that there is a total absence of grittiness or abrasiveness in the velvety feel of the powder. The products are colorless or translucent and the bulk powder may appear translucent or, more often, white. The esterified metal silicates are often colored. For example, crocidolite asbestos is bright blue, even after acid treatment and esterification. The products are odorless and tasteless.

The light, fluffy nature of the preferred products can be expressed by their bulk density, expressed as bulk densities of about 0.15 g./cc. or below, under a compressive load of 3 pounds per square inch (p. s. i.) and about 0.30 g./cc. or below, at 78 p. s. i. are preferred for some uses.

The preferred products can be compressed into pellets for handling and shipment and then easily reduced again to powder by milling.

The internal structure of the original substrate is substantially unchanged by the surface esterification, hence, the description already given of the substrates also applies to the internal structure of the esterified products.

One esterified product of great value has an internal structure in the form of a coherent aggregate wherein the ultimate units are dense, non-porous, spherical, amorphous silica having average diameters in the range of 15 to 100 millimicrons. Such aggregates have a labyrinth of pores, averaging at least about 4 millimicrons diameter, and have specific surface areas of at least 25 m.²/g. The ultimate units cohere through siloxane bonds formed prior to esterification, and the bonds may be reinforced by further deposition of silica. Aggregates in which the bond strength corresponds to coalescence factors ($S_c/S_n$) between 0.9 and 1.3 are preferred. Aggregates less strongly coherent have value for some purposes but have the disadvantage of giving a less rigid structure. Also, higher coalescence factors are not preferred for some uses since they make it very difficult to comminute the aggregates (which are often 1 to 10 microns or larger) into smaller particles, the latter particles being desirable, for example, when the products are used in organic coating compositions, plastics, oils or the like. In other words, the preferred powders permit the making of compositions of organic materials strengthened or reinforced or thickened by tiny, structured, siliceous skeletons. Ultimate structural units of 15 to 30 millimicrons are especially preferred because of ease of processing and effectiveness.

Another valuable product of this invention has an internal structure of amorphous silica units as tiny as to give a specific surface area of at least 200 m.²/g., the units being joined in coherent aggregates. For most purposes products in which the substrate has a specific surface area of about 900 m.²/g. is a practical upper limit; however, the range of about 200 to 600 m.²/g. is a preferred range because such products have a balanced proportion of inorganic internal structure to ester groups giving excellent reinforcing and filling properties together with outstanding compatibility for organic materials. Preferably these coherent aggregates have such an open network structure as to have an average pore size of at least 4 millimicrons diameter. When pores of this size are present in the esterified particles, the further reduction in size of the particles by comminuting, grinding, milling, etc. can be accomplished without destroying the organophilic characteristics of the material.

In amorphous silicas, the size or diameter of the pores between the dense ultimate silica units is smaller when the units are more tightly packed together; hence, a greater proportion of the surface is lost through points of contact between the units, and the final specific surface area available for esterification is greatly diminished. When an esterified product of this type is subsequently broken apart in dispersing it by milling into organic polymers such as plastics, the ultimate units are in many cases broken apart from each other, thus creating an appreciable amount of unesterified surface. For this reason, preferred esterified products are those prepared from substrates in which the average pore size is at least about four millimicrons in diameter. Furthermore, such products are more stable toward hydrolysis at average humidity. Very small pores tend to attract and hold condensed moisture, which in time may lead to hydrolysis of the ester. The large-pored products are hence preferred.

A third embodiment of the products of the invention has a substrate of water-insoluble metal silicate. The ultimate dense units in this embodiment are usually non-spherical. They can be shaped like needles, threads, rods, laths, sheets or plates, depending upon the crystalline structure of the original substrate. When these ultimate units are chemically bonded together by siloxane linkages they form coherent aggregates having strong siliceous lattices.

Yet another embodiment of the internal structure in products of the invention is that in which the lattices of metal silicates are strengthened by deposition of amorphous silica on the metal silicates.

The bulk density and crushing strength of the esterified products having substrates of coherent amorphous silica aggregates are dependent on the corresponding properties of the internal structures. The pore size affects bulk density, since the true density of the amorphous silica units is about 2.2 g./cc. The coalescence factor affects the crushing strength of the products. Where the bonds between the ultimate units within the aggregates are strong, the effect of pressure is that the powder will be compacted by bringing the aggregates closer together without collapsing them. Only by breaking down the bonds between the ultimate units is high bulk density effected.

The kind of ester group which is chemically bound to the substrate will depend on the alcohol which is used as the esterifying agent.

For many purposes aliphatic unsaturation is undesirable. In fact, for very inert products all unsaturation is avoided and the ester groups contain only saturated hydrocarbon radicals, i. e., the ester groups are alkoxy groups. Such groups make the products organophilic and hydrophobic and quite unreactive. While both straight and branched chains are quite satisfactory, straight chains have the advantage that they exhibit a minimum of steric hindrance, and hence, a maximum number of ester groups can be chemically bound to a given surface area.

On the other hand, products containing unsaturated hydrocarbon radicals are especially useful as fillers for partially polymerized organic compounds, as previously mentioned.

The products of this invention are organophilic and may also be hydrophobic. Before esterification, the substrate particles are hydrophilic—that is, have a strong affinity for water and are readily wetted by it, probably because they have surfaces containing silanol (—SiOH) groups. Now when the hyrdoxyl groups of the silanols are replaced by ester gropus to the extent contemplated in this invention, the particles become organophilic, in that they have an affinity for organic liquids and are readily wetted by them even in preference to water. If enough silanols are esterified, the products are also hydrophobic.

Simple tests to determine whether surface siliceous powders are hydrophobic or organophilic can be carried out as follows:

The powder is slurried at least twice with an excess of warm methyl ethyl ketone and filtered, to remove alcohol not chemically reacted with the siliceous surface. It is then dried at 75° C. in a vacuum oven for about 24 hours. (For esterified products containing an excess of the lower alcohols, the preliminary solvent extraction is not necessary since the excess alcohol is evaporated off in the drying.) The dry powder is passed through a 200 mesh screen. A ¼ cc. sample of the powder is added to 10 cc. of distilled water at room temperature in a 30 cc., 6 in. long test tube. The tube is stoppered and given about five vigorous vertical shakes. The siliceous material which has not wetted into the water (e. g., is floating on the surface) and does not wet into water after standing for 15 minutes, is considered to be hydrophobic. Then 10 cc. of normal butanol is added to the test tube, and it is again stoppered and given five vigorous vertical shakes. It will be seen that the butanol forms a separate layer which floats on the water. The siliceous material which rises above the interface and passes into suspension in the butanol layer upon gentle stirring is considered organophilic according to this test. (If an emulsion results upon shaking, it may be broken by gentle agitation with a glass stirring rod or by allowing the mixture to stand for as much as one-half hour, if necessary, to complete the test.) All of the products of this invention are definitely organophilic according to this test, and the preferred products are sufficiently highly esterified to be also hydrophobic and consequently, water-resistant.

Particularly preferred products of this invention are not only hydrophobic but are so highly esterified as to adsorb essentially no methyl red dye from benzene solution and are outstanding in their ability to resist wetting by water. The adsorption of methyl red from benzene is described as a method for determining specific hydroxylated surface area by Shapiro and Kolthoff, Journal American Chemical Society, 72, 776 (1950). In its present adaption the method consists of removing any free alkali metal ion in the esterified sample, drying it, and intensively mixing it with an anhydrous benzene solution of the acid form of methyl red dye. Surface silanol groups will adsorb the dye, whereas ester groups will not. Equilibrium adsorption is reached in about two hours and an equilibrium concentration of 400 milligrams of dye per liter insures saturation adsorption. The methyl red adsorption capacity is calculated from the weight of dye adsorbed per unit weight of sample, the actual adsorption being measured spectrophotometrically at 4750A on a Beckman Model DU Series 2561 spectrophotometer. The specific hydroxylated surface area of the sample, expressed as square meters per gram (m.²/g.) can be calculated from the expression:

$$\frac{\text{Methyl red adsorption capacity}}{269.3} \times 116 \times 10^{-20} \times 6.02 \times 10^{23}$$

269.3 being the molecular weight of the methyl red, $6.02 \times 10^{23}$ being Avagadros' number, and $116 \times 10^{-20}$ being an area factor based on the fact that each methyl red molecule covers an area of 1.16 square millimicrons. Specific hydroxylated surface areas of less than 5 m.²/g. as so calculated are within the limit of experimental error and are considered to be essentially zero.

There is a correlation between the number of ester groups present per unit surface area and the organophilic and hydroxylated properties of the products of this invention. A certain minimum number of ester groups per unit surface area makes the products organophilic. As this number is increased, the preference for organic solvents increases. At a much higher concentration than the minimum, a second significant change occurs, and the products are not only highly organophilic but they cease to be hydrophilic. They are hydrophobic. They not only exhibit a preference for the organic solvent over water, but even in the absence of organic solvent they refuse to enter the water.

To be hydrophobic, the esterified products need not have their surfaces crowded with ester groups. Some uncovered spots can be present as illustrated at 10 in Figure 1 of the drawings, provided the repulsion of water by the ester groups is greater than the attraction of water by the uncovered spots. These uncovered spots can be measured as specific hydroxylated surface area, by the methyl red adsorption technique described above.

For most substrates prior to esterification, and particularly for those having specific surface areas, as determined by nitrogen adsorption, lower than 200 m.²/g., the specific hydroxylated surface area as determined by dye adsorption is approximately equal to the specific surface area. In this case, practically all of the surface which is accessible to nitrogen is also accessible to dye molecules. In the case of substrates having much higher specific surface areas, particularly those in which the pores are very small, accessibility of the whole surface to methyl red dye molecules is less complete, resulting in a low value for hydroxylated surface area. However, there are also other instances where the chemical nature of the surface, rather than the physical structure, results in a diminution of the dye adsorption capacity of the substrates. In the case of certain siliceous materials, for example, there are areas of the surface which apparently are devoid of silanol groups. These areas consist of a siloxane surface where the silicon atoms are attached only to oxygen rather than hydroxyl groups. Even in such cases, however, reduction in specific hydroxylated surface area due to esterification is a good measure of the extent of esterification. Failure of an esterified product to adsorb any methyl red dye shows that no unprotected hydroxylated surface area remains.

The degree of surface esterification can also be determined directly by determining the carbon content of the product and measuring the surface area of the substrate by nitrogen adsorption, and calculating the carbon as ester groups per unit area.

The products of this invention have —OR groups chemically bound, rather than physically adsorbed, to the surface of silica. The chemically bound —OR groups cannot be desorbed even under very high vacuum and relatively high temperatures, in contrast to adsorbed alcohols which are readily removed in this manner. The esterified products are temperature-stable, and may be heated to at least 150° C. under a high vacuum of $10^{-5}$ millimeters of mercury pressure for 1 hour or more, or for one hour at 150° C. in a dry nitrogen atmosphere, or for one hour at 120° C. in dry air, without significant decomposition. When heated to very high temperatures, e. g., 500° C., in air or oxygen, the —OR groups are destroyed by oxidation.

The —OR groups chemically reacted with the silica surface cannot be removed by washing with hot methyl ethyl ketone or similar solvents, or by prolonged extraction in a Soxhlet extractor. No alcohol is displaced from the silica by treatment with such solvents, in contrast to the displacement of one solvent by another, which is observed in the case of ordinary physical adsorption.

The reaction of alcohols with surface silanol groups resulting in the formation of chemically bound ester groups should not be confused with the physical adsorption of alcohol which in some cases is sufficiently strong to make it difficult to remove from the siliceous surface. However, physically adsorbed alcohols do not render the surfaces either organophilic or hydrophobic, and can be removed by subjecting the material to high vacuum at relatively low temperatures.

A further difference between surface-siliceous products containing alcohol held by physical adsorption and esterified products of the present invention is noticed in the effect of esterification on methyl red dye adsorption. Thus, physically adsorbed alcohol does not change the methyl red adsorption, whereas esterification lowers it significantly.

One of the advantages of the esterified products of this invention is their stability towards hydrolysis, i. e., their ability to retain their organophilic and hydrophobic characteristics in a humid atmosphere and even in contact with liquid water for long periods of time. The products which are most highly esterified, i. e., those which show no dye adsorption, are the most stable towards hydrolysis under very rigorous conditions involving treatment of the esterified silica with water and steam at 100° C. The products which are hydrophobic but still show significant dye adsorption, are also quite stable towards hydrolysis, being considerably more stable than the products which are merely organophilic.

Beginning with —OR groups wherein R is ethyl, hydrophobic products are obtained. Moreover, the organophilic products (as well as those which are both organophilic and hydrophobic) have stability against hydrolysis under quite severe conditions. They are sufficiently stable to permit their use under most conditions which they are likely to encounter.

Highly esterified silicas containing primary ester groups having 3 or more carbon atoms in the chain are particularly highly hydrophobic, hence are particularly difficult to wet with water and are unusually stable toward hydrolysis even under very severe conditions. Consequently n-propanol is the shortest chain member of a highly preferred class of esterifying agents which contain from 3 to 6 carbon atoms.

Since the esterification of this invention is a surface phenomenon, the effectiveness of the treatment may be measured by calculating the esterification in terms of the number of ester groups per 100 square millimicrons surface area of the internal structure. The esterification value, E, is the number of —OR groups per one hundred square millimicrons of surface area, and is calculated from the expression:

$$E = \frac{6.02 \times 10^{23} \times C}{12 n \times S_n \times 10^{18}} = \frac{50200 \times C}{n \times S_n}$$

where C is the weight of carbon in grams attached to 100 grams of siliceous substrate, $n$ is the number of carbon atoms in the —OR groups, and $S_n$ is the specific surface area in m.$^2$/g. of the siliceous substrate as determined by nitrogen adsorption.

Where the type of alcohol used in esterification is known, a carbon analysis and the specific surface area of the substrate esterified are all that is required in order to calculate the surface esterification. On the other hand, where a sample is to be analyzed in which the type of alcohol is unknown, the sample can be decomposed with an acid and the alcohol can be recovered and identified so that the number of carbon atoms in the alcohol can be determined. The specific surface area of the siliceous substrate may be determined, after burning off the ester groups as explained hereinafter, and the degree of surface esterification may be calculated as above described.

To render a surface siliceous material markedly organophilic, it is necessary to have present on the surface more than about 100 ester groups per 100 square millimicrons of the substrate surface area.

A hydrophobic product usually requires at least 200 ester groups per 100 square millimicrons of substrate surface, based on nitrogen absorption measurements on the unesterified surface. This surface area may be determined either on the siliceous material before esterification or on the siliceous skeleton after the ester groups have been removed by a process which does not affect the nature of the skeleton. For hydrophobic products, even fewer ester groups may be required in the case of some alcohols, but for most of the alcohols and especially for the preferred alcohols, about at least 200 alcohol molecules must be reacted with every 100 square millimicrons of surface to form the corresponding number of ester groups.

Even in the case of products which have been rendered hydrophobic with the minimum required number of ester groups, the surface is not completely crowded with ester groups, and there still remain some exposed surface silanol groups as evidenced by the fact that the products have an appreciable hydroxylated surface area. Products of maximum stability toward hydrolysis are those in which the ester groups are crowded together so closely on the surface that the surface is completely protected. When this occurs, the specific hydroxylated surface area as measured by methyl red dye is zero. For most of the ester groups, this requires at least about 270 ester groups per 100 square millimicrons. An exception to this is the metal silicates where portions of the surface are devoid of esterifiable silanol groups yet retain other polar groups which adsorb dye. In such cases the product may have a measurable dye adsorption although the ester groups can be crowded closely together on the esterified portions of the surface giving them maximum stability toward hydrolysis. Because some ester groups differ in shape considerably from others, there are some cases where this number of ester groups cannot be crowded onto the surface, and the surface is completely protected by fewer ester groups than 270 per 100 square millimicrons. However, for the preferred alcohols, at least 270 ester groups are required.

In some instances, because of the structure and spacing of the ester groups on the surface, even with about 270 of such groups per 100 square millimicrons of surface area there may remain tiny uncovered areas which are too small to permit adsorption of the large methyl red dye molecules or other large molecules, but which can, under the proper conditions, still adsorb a few smaller molecules such as water. In such cases, it is possible, by using more stringent reaction conditions or by using mixtures of alcohols, to force more than 270 ester groups to react per 100 square millimicrons of the surface. In these products the chemically-reacted ester groups are crowded so closely together on the surface that even greater stability is achieved.

The effectiveness of a particular ester group in blocking or protecting a portion of the silica surface is dependent upon the cross-sectional area of the group. Thus, a large, branched, "bushy" group can act as an umbrella, and effectively protect a larger area of the surface than can an —OR group in which R is a short straight chain hydrocarbon radical. An approximate relationship between the characteristic bushiness of an ester group and its effective surface protection may be derived from the molecular structure. The term $n$ (branch number) is defined as the maximum number of equivalent branches in the ester groups which is determined by counting the maximum number of carbon atoms each of which is separated from the oxygen atom by an equal number of carbon atoms. This corresponds to the width of the hydrocarbon group at its thickest point, if spread out flat. As an extreme case of branching, the following molecule is 5 carbon atoms wide at its broadest point, as counted above: 5,7,7-trimethyl-2-(1,3,3-trimethylbutyl)-1-octanol. The number of ester groups required to protect the surface so as to give zero methyl red adsorption can be estimated for alcohols having $n$ greater than 2 on the basis that an alcohol with a branch number $n$ will cover $(0.14\ n)$ square millimicrons.

In the foregoing characterization of the products of this invention the surface esterification is described in terms of the number of ester groups per 100 square millimicrons of surface area of the substrate. This surface area is calculated from the nitrogen adsorption. However, the specific surface area of the esterified product, so determined, is not always the same as the specific surface area of the original substrate. For substances with specific surface area up to 100 m.$^2$/g., the amount of alcohol reacted per unit weight of material is relatively small, and has relatively little effect on the specific surface area of the final product. On the other hand, with siliceous solids of extremely high specific surface area, which can react with relatively large proportions by weight of alcohol, the specific surface area of the esterified product is lower than that of the original substrate material because of the extra weight of reacted alcohol which is included in the product, without a corresponding increase in the total surface. The specific surface area of the product, which is the total surface area divided by the weight, is therefore less than that of the internal structure. This change is particularly marked when the siliceous solid is esterified with alcohols of high molecular weight, giving final products which are high in added organic content.

In siliceous solids of extremely high surface area, the effect of esterification on specific surface area is particularly marked also where the pores within the solid are very small. It is probable that small surface irregularities and fine pores are blocked as a result of esterification of the walls of these pores with long chain alcohols, thereby also contributing to a decrease in specific surface area.

That this change in surface area was not due to a basic change in the internal siliceous structure during esterification, is demonstrated by the fact that the substrate can be recovered in its original form, and with its original surface area, by removal of the ester groups. The esterified product may be decomposed by slowing heating it in a stream of oxygen up to 500° C. and holding it there for about 3 hours. Thus, a sample of precipitated, reinforced silica gel having a specific surface area of 314 m.$^2$/g. was esterified with butanol, giving a product with a specific surface area of 277 m.$^2$/g. as determined by nitrogen adsorption, and a specific hydroxylated surface area of zero as determined by dye adsorption. The esterified product was then heated in a stream of oxygen to burn off the butoxy groups from the silica substrate. The resulting siliceous material was placed in a 100% relative humidity chamber for one week at 30° C., in order to rehydrate the surface and was then dried at 110° C. for one hour so that valid dye adsorption measurements could be obtained on the substrate. The specific surface area of the resulting product was 318 m.$^2$/g., as measured by nitrogen adsorption (which compares very closely with the 314 m.$^2$/g. of the unesterified substrate), and the specific hydroxylated surface area was 311 m.$^2$/g., as determined by adsorption of methyl red dye.

The —OR groups are chemically bonded to the silica surface of the substrate. Further, from the dimensions of the —OR groups and the surface area of substrates it is apparent that even in cases of the most complete esterification, the number of —OR groups per unit area never exceeds that which would be equivalent to a monomolecular layer of —OR groups on the surface. Consequently, the organophilizing or hydrophobing of the surface is accomplished by a minimum number of organic groups. These profound changes in the surface character of the silica are brought about with a minimum increase in organic content and with minimum changes in the particle dimensions, total surface area, or internal properties. The esterified product is thus not the result of a gross multimolecular layer or polymer on the exterior walls of the particles.

The esterified products of this invention can be compounded with organic substances to form compositions of matter wherein the esterified materials become practically an integral part of the organic composition due to their increased compatibility. Such compositions are filled, extended, strengthened, reinforced and made more water-resistant by the esterified products. Known uses for non-esterified siliceous materials take on new significance when the esterified products are employed. Such novel compositions are described and claimed in my copending United States application Serial No. 171,760, filed July 1, 1950.

This application is a continuation-in-part of my application Serial No. 171,759 filed July 1, 1950, as a continuation-in-part of my then co-pending applications Serial No. 130,343, filed November 30, 1949, and Serial No. 590,723, filed April 27, 1945, each of the aforementioned three applications now abandoned.

EXAMPLES

The invention will be better understood by reference to the following illustrative examples in addition to those already given.

*Example 1*

A siliceous substrate is prepared in the following manner:

Fifty-six liters of a solution of low molecular weight polysilicic acid containing 6% $SiO_2$ and having a pH of 2.5 is prepared by injecting equal volumes of dilute solutions of sulfuric acid and sodium silicate having an $SiO_2:Na_2O$ weight ratio of 3.25 through separate orifices under high pressure into a mixing zone. To the 56 liters of polysilicic acid solution is added five liters of water and the solution is then permitted to stand at 30° C. for 21 hours to permit the silicic acid to polymerize. At the end of this time polymerization has not progressed to the point where the solution has become viscous.

To further polymerize the silicic acid there is added, with very violent agitation, a sufficient volume of 12% sodium hydroxide solution to raise the pH to 3.5. The mixture is then stirred for seven minutes during which time the viscosity increases to such a degree that the delivery time from a viscosity pipette increases from about 10 to 93 seconds. A sufficient volume of 30% sulfuric acid is then added with continued agitation to reduce the pH as quickly as possible to 2.0, thereby greatly diminishing the rate of polymerization.

Immediately there is added 5.5 liters of tertiary butyl alcohol and 18 kg. of sodium chloride and the mixture is then stirred for 30 minutes. During this time the viscosity increases rapidly due to formation of a precipitate of silica so that there must be added 35 liters of water, 11.8 kg. of sodium chloride and 3.0 liters of tertary butyl alcohol in order to maintain the mixture in a fluid condition and yet maintain a medium of constant composition. Stirring is continued for 30 minutes and the mixture then permitted to stand for 18 hours.

The silica suspension is filtered, the filter cake broken up and slurried with 110 liters of water to which has been added 90 cc. of a 30% sulfuric acid solution in order to maintain the pH of the mixture around 2.0. The slurry is then filtered and the filter cake again washed twice by reslurrying with acidulated water and filtering. The thrice washed cake is then slurried with 25 liters of tertiary butyl alcohol, filtered, and the filter cake washed with 18 liters of tertiary butyl alcohol in order to remove as much water as possible.

The wet precipitate, after separation from the precipitation medium, consists of finely divided, hydrated silica in the form of coherent aggregates.

Esterification of the substrate is accomplished as follows:

The alcoholic filter cake is placed in a still with 18 liters of n-butyl alcohol. Heating the still externally wits steam the slurry is distilled with intermittent additions of n-butyl alcohol to maintain the charge in a fluid condition until the water content in the distillate has dropped from an original value of 13.4 g. of water per 100 cc. to less than 1 g. of water per 100 cc. During the distillation there is added 28 liters of n-butyl alcohol to maintain the charge in a fluid condition. A total distillation time of about eight hours is required. Finally the distillation is continued with no further addition of n-butanol until no more distillate is recovered, the charge in the still being completely dry.

The esterified product is an extremely finely divided, free-flowing, fluffy powder weighing 4.02 kg. and containing 80.35% $SiO_2$ by weight after being dried in an oven 18 hours at 130–135° C. When placed in a test tube with water and butanol, the product seeks the organic phase and, hence, is organophilic. It is extremely hydrophobic, that is, it is not wetted when shaken up with water but is readily suspended in benzene and other organic solvents. After being dried 18 hours at 130–135° C. the polysilicic acid ester has the following analysis:

| | Percent |
|---|---|
| Loss on ignition | 19.46 |
| Silica | 80.35 |
| Nonsiliceous ash | 0.19 |
| Iron | 0.07 |
| Sodium | 0.07 |
| Carbon | 9.57 |
| Hydrogen | 2.99 |

On the basis of this analysis the esterified product contains 0.2 butoxy group per silicon atom. The carbon content is not reduced by repeated extraction with dry benzene.

The specific surface area of the esterified product was 533 m.²/g. by nitrogen adsorption. Electron micrographs revealed that the product consisted of agglomerated microgel particles. The ultimate dense particles were too small to be measured adequately by the electron microscope, but from their appearance and surface area they were undoubtedly of the order of 5 millimicrons in diameter.

The esterified product described was useful as a reinforcing agent in an approximately 75% butadiene/approximately 25% styrene co-polymer rubber, known to the trade as Buna S or GR–S, by incorporating it into the rubber along with the customary vulcanizing and curing agents.

*Example 2*

This example illustrates the esterification of a substrate comprising aggregates of dense, ultimate amorphous silica units, by azeotropically distilling out water therefrom in the presence of an alcohol.

The substrate was prepared in the following manner:

A silica "heel" sol, containing 1.5% of $SiO_2$, was made by adding one volume of a solution of 0.48 N sulfuric acid at a uniform rate, over a period of 30 minutes and at a temperature of about 30° C., with violent agitation, to three volumes of a solution of sodium silicate containing 2% $SiO_2$ and having a molar $SiO_2:Na_2O$ ratio of 3.36. Thus, 80% of the $Na_2O$ in the original sodium silicate was neutralized and the pH dropped from 11.3 to about 9. This clear sol contained extremely tiny, discrete particles of silica, the average diameter being less than 5 millimicrons.

The size of ultimate particles in the heel sol was built up by heating it to 95° C. and adding solutions of sodium silicate and sulfuric acid simultaneously but separately with vigorous agitation, at a uniform rate over a period of two hours. The sodium silicate solution contained 10% $SiO_2$ and had a molar $SiO_2:Na_2O$ ratio of 3.36. Enough 4% sulfuric acid solution (approximately equal in volume to the sodium silicate solution) was added so that 80% of the $Na_2O$ in the silicate solution was neutralized. The addition of silicate and acid was continued until one part of $SiO_2$ had been added for each part of $SiO_2$ present in the heel. During the additions the pH of the heel slowly rose from 9 to 10 and was then maintained at about 10. The sodium ion concentration remained below 0.3 N throughout the process.

During the heating of the heel and subsequent addition of silicate and acid, the tiny, discrete particles of silica increased in size and then became chemically bound together in the form of coherent aggregates of supercolloidal size wherein the colloidal particles were present as dense ultimate units. The aggregates were precipitated.

To aid filtration, the slurry was further flocculated with a 2% solution of a mixture of cetyl and lauryl trimethylammonium bromide, 0.16% of the mixed compounds being added, based on the weight of the silica. The slurry was filtered, the filter cake reslurried in water, the pH adjusted to about 7 with dilute sulfuric acid, again filtered on a vacuum filter, and the filter cake washed with water.

The filter cake contained about 12.5% by weight of $SiO_2$. After drying in air at 120° C. the specific surface area of the siliceous substrate, in powder form, ranged from about 250 to 365 m.$^2$/g. on separate batches, and averaged about 300 m.$^2$/g.

The substrate thus prepared was esterified as follows:

Sixteen hundred grams of the wet filter cake (containing about 200 grams of silica on the dry basis) were slurried with 1300 grams of normal butanol, making 3½ liters of a suspension having a pH of 6.0. A 600 cc. portion of the slurry was adjusted to pH 5.5 with HCl, and an additional 300 cc. of butanol were added to reduce the viscosity. This portion was then placed in a 2-liter, three-necked flask equipped with an electric heating mantle, a thermometer, a dropping funnel, a mechanical stirrer, and a ¾ inch column, 3 ft. long, packed with ⅛ inch glass helices. Water was then removed by azeotropic distillation at a reflux ratio of 2:1, while 150 cc. of butanol were added to keep the viscosity low. When the distillate no longer separated into two layers and the pot temperature rose to 110° C. (indicating that most of the water had been removed), the reflux ratio was increased to greater than 10:1, and the distillation was continued for eight hours. During the first part of this period, the pot temperature rose to 118° C., the boiling point of normal butanol, where it remained for the rest of the refluxing period. After the refluxing was completed, the slurry was cooled and filtered. The cake, which was wet with butanol, was dried on a steam bath until the odor of butanol had nearly disappeared, and then in a 120° C. oven for 24 hours.

The dry product was ground in a mortar to a fluffy, white powder. Thirty-five grams of this esterified silica product was obtained. The product was organophilic as indicated by the fact that it migrated into the organic layer when shaken with a mixture of water and normal butanol. It is further characterized as product No. 1 in Table I, below.

Another 600 cc. portion of the substrate slurry was subjected to azeotropic distillation with n-butanol as above described, except that the reflux time was three hours instead of eight. The organophilic, esterified product obtained is characterized as product No. 2 in Table I.

A further 600 cc. portion of substrate slurry was subjected to azeotropic distillation as already described up to the point at which the distillate no longer settled into two layers, and the pot temperature rose to 110° C., indicating that most of the water had been removed. The slurry was then cooled, filtered and dried. The esterified product obtained is characterized as product No. 3 in Table I.

From a comparison of products 1, 2, and 3, it is evident that significant esterification was reached during the azeotropic dehydration, carried out up to a temperature of 110° C. The products of all of these examples were organophilic. Additional esterification occurred as the result of refluxing from 110 to 118° C., with removal of an additional, very small amount of water, for the periods of three and eight hours, respectively. This esterification was accompanied by a decrease in the specific surface area of the esterified products, and a corresponding increase in bulk density. The esterification results in a considerable decrease in the specific hydroxylated surface area with the increase in esterification.

Further separate 600 cc. portions of the substrate slurry were subjected to esterification in the same manner as just described for product No. 2, with the difference that the pH was adjusted to 8.5 to make product No. 4 and to 2.0 to make product No. 5, by the addition of sodium hydroxide and HCl, respectively, as compared to the pH of 5.5 previously used.

The characterization data of these organophilic esterified products is given in Table I. A comparison of products 2, 4, and 5 demonstrates that good esterification can be obtained in these cases over the range of at least pH 2 to pH 8.5, with more complete esterification being obtained at the higher pH values.

EXAMPLE 2.—TABLE I

| Product No. | Build-up | $S_n$ substrate a (m.$^2$/g.) | Av. pore diameter of substrate (mμ) | Reflux time (hrs.) | Chemical analyses percent by weight | | | $S_n$ product (m.$^2$/g.) | Specific hydroxylated surface area (m.$^2$/g.) | E | Percent surface covered | Density (g./cc.) | | |
|---|---|---|---|---|---|---|---|---|---|---|---|---|---|---|
| | | | | | $SiO_2$ | C | H | | | | | 3 p.s.i. | 78 p.s.i. | 1,560 p.s.i. |
| 1 | 1:1 | 330 | c 14.6 | 8 | 90.05 | 4.70 | 1.45 | 304 | 61 | 189 | 80 | 0.109 | 0.149 | 0.418 |
| 2 | 1:1 | 330 | c 14.6 | 3 | 88.79 | 4.37 | 1.32 | 317 | 113 | 175 | 64 | .132 | .132 | .415 |
| 3 | 1:1 | 360 | c 14.6 | 0 | 86.55 | 2.39 | 1.07 | 356 | 245 | 86 | 31 | | | |
| 4 | 1:1 | | c 14.6 | 3 | 87.75 | 5.73 | 1.50 | 280 | 66 | | 76 | | .143 | .417 |
| 5 | 1:1 | 360 | c 14.6 | 3 | 88.64 | 4.47 | 1.36 | 339 | 98 | 164 | 71 | | .167 | .428 |

E=number of ester groups per 100 square millimicrons of surface area.
$S_n$=specific surface area as determined by nitrogen adsorption.
a=measured after burning ester groups off of esterified product and rehydrating the siliceous substrate.
c=measured on substrate before esterification.

Example 3

This example illustrates the esterification, by azeotropic distillation with n-butanol, of a conventional silica gel which has not been dried from water and therefore has not undergone structure collapse.

To prepare the silica gel for use as the substrate, two liters of an aqueous solution containing 45 grams $H_2SO_4$ were heated to 80° C., and there was added, over a period of 15 minutes with stirring, two liters of an aqueous solution of sodium silicate containing 4% $SiO_2$ and having a molar ratio of $SiO_2:Na_2O$ of 3.36. The temperature was maintained at 80° C. throughout the mixing; thereafter the solution was cooled to 50° C. and adjusted to a pH of 5, whereupon it gelled. The gel was broken up, filtered, and the filter cake was washed on the filter with water and then with methanol. The wet filter cake was esterified by azeotropic distillation with n-butanol according to the procedure described for product No. 2 of Example 2.

An organophilic, esterified product was obtained. It consisted of supercolloidal aggregates made up of tiny ultimate units and had a weak gel structure as evidenced by the high densities obtained. The surface area of the sample was very high, as was the esterification obtained. The product is further characterized below:

| | |
|---|---|
| $S_n$ substrate (m.²/g.) | ª567 |
| Av. pore diameter of substrate (mμ) | 8.9 |
| Chemical analysis: | |
|    Percent by wt. $SiO_2$ | 81.13 |
|    Percent by wt. C | 10.11 |
|    Percent by wt. H | 2.31 |
| $S_n$ product (m.²/g.) | 542 |
| Specific hydroxylated surface area (m.²/g.) | 87 |
| E | 254 |
| Density (g./u.): | |
|    3 p. s. i. | 0.361 |
|    78 p. s. i. | 0.380 |
|    1560 p. s. i. | 0.504 |

E=number of ester groups per 100 square millimicrons of surface area.
$S_n$=specific surface area as determined by nitrogen adsorption.
ª=measured after burning ester groups off of esterified product and rehydrating the siliceous substrate.

Example 4

This example illustrates the esterification of a silica aerogel by azeotropic distillation with n-butanol.

As the substrate, silica aerogel was used ("Santocel C" produced by the Monsanto Chemical Co.) having a specific surface area of 157 m.²/g. and a specific hydroxylated surface area of 114 m.²/g. as determined by dye adsorption. The bulk density of the material was 0.087 g./cc. at 3 p. s. i.; 0.139 g./cc. at 78 p. s. i.; and 0.451 g./cc. at 1560 p. s. i. above atmospheric pressure.

Ten grams of the dry aerogel stirred into 200 cc. of water gave a slurry having a pH of 4.8. The pH was adjusted to 5.5 by the addition of sodium hydroxide. The silica was then transferred to n-butanol, azeotropically dehydrated and refluxed for 3 hours and the esterified product recovered as described for product No. 2 of Example 2.

The esterified product was organophilic, and was further characterized as follows:

| | |
|---|---|
| $S_n$ substrate (m.²/g.) | 157 |
| Av. pore diameter of substrate (mμ) | 12.4 |
| Reflux time (hrs.) | 3 |
| Chemical analysis: | |
|    Percent by wt. $SiO_2$ | 93.96 |
|    Percent by wt. C | 1.88 |
|    Percent by wt. H | 0.74 |
| $S_n$ product (m.²/g.) | 154 |
| Specific hydroxylated surface area (m.²/g.) | 71 |
| E | 158 |
| Percent surface covered | 54 |

Example 5

This example illustrates the preparation of a product having a high degree of surface esterification, by heating a siliceous substrate with n-butanol under pressure.

A siliceous substrate was prepared as follows: One volume of a solution of 0.48 N sulfuric acid was added at a uniform rate over a period of 30 minutes, at a temperature of about 30° C., to three volumes of a solution of sodium silicate containing 2% $SiO_2$ and having a molar $CiO_2:Na_2O$ ratio of 3.36:1. The sulfuric acid solution was chemically equivalent to 80% of the $Na_2O$ in the sodium silicate solution. Vigorous agitation was provided to insure thorough and rapid mixing and the temperature of the reacting mass was maintained below 40° C. throughout. The acid was added at a point near the agitator so that distribution was almost instantaneous. During the acid addition, the pH dropped from 11.3 to about 9.7 and the sodium ion concentration remained below 0.3 N throughout the process. A clear sol resulted.

The sol obtained by the above step contained 1.5% $SiO_2$. The solids in the sol consisted of discrete particles of silica having an average diameter less than 5 millimicrons, too small to be measured by the electron microscope.

The sol was heated to 95° C. Solutions of sodium silicate and sulfuric acid were then added simultaneously at a uniform rate over a period of two hours. The sodium silicate solution added contained 13.2% $SiO_2$ and had a molar $SiO_2:Na_2O$ ratio of 3.36:1. The sulfuric acid was a 4% aqueous solution and was added in amounts sufficient to neutralize 80% of the $Na_2O$ in the silicate solution. The addition of silicate and acid was continued until one part of $SiO_2$ had been added for each part of the $SiO_2$ present in the initial sol. The pH of the mixture remained in the range from 10.2 to 10.4 during the simultaneous addition step. Sodium ion concentration remained below 0.3 N throughout the process.

At the conclusion of the simultaneous addition of silicate and acid, acid addition was continued until an amount had been added such that the pH of the reacting mass measured at 25° C. was lowered to 5.5. Acid addition was then stopped.

During the heating of the initial sol and the subsequent addition of silicate and acid, the tiny, discrete, dense ultimate particles of silica increased in size; they became chemically bound together in the form of open networks or coherent aggregates of supercolloidal size. This action is called the "build-up" step. The aggregates precipitated so that the resulting mass was in the form of a slurry.

Final flocculation of the coherent aggregates of amorphous silica was accomplished by maintaining the slurry at a temperature of 95–100° C. for a period of four hours.

The resulting slurry was then filtered and washed on the filter to remove soluble sodium sulfate. The wet filter cake as obtained on the vacuum filter contained 6-7% $SiO_2$ by weight.

The esterification of the substrate was carried out as follows: 380 parts by weight of the filter cake containing about 24 parts by weight of silica was slurried in 310 parts by weight of n-butanol. The butanol slurry of the wet filter cake was azeotropically dehydrated, continuously removing water and recycling butanol until no more water separated in the still head. Some butanol was then distilled until the slurry remaining in the still pot contained about 9% by weight $SiO_2$ and less than 0.3% water.

The slurry was then heated at 320° C. under autogenous pressure for about one hour. The butyl estersil thus produced was recovered from the butanol and dried under 24 inches mercury vacuum at 120° C. to remove the remaining physically adsorbed butanol.

The dry butyl estersil obtained was an organophilic and hydrophobic pulverulent powder. By chemical analysis it was shown to contain 7.74% carbon, 1.58% hydrogen and 1.49% non-siliceous ash. The specific surface area, $S_n$, of the butyl estersil as determined by nitrogen adsorption was 290 m.²/g. The specific hydroxylated surface area, $S_D$, as determined by the methyl red dye adsorption method was 5.8 m.²/g.

The specific surface area of the substrate obtained by burning off the butylester coating from the butyl estersil was 338 m.²/g. as determined by nitrogen adsorption. Thus there were 311 n-butoxy groups per 100 square millimicrons of substrate surface area.

On a series of products made under large-scale operating conditions by the method above-described, products having properties in the following ranges were obtained:

Specific surface area by nitrogen, m.²/g ------ 274 to 312
Percent carbon by analysis ------------------- 7.07 to 8.00
Specific hydroxylated surface area, $S_D$, by dye adsorption, m.²/g --------------------- 3.4 to 13.5

Under the practical operating conditions encountered in plant operation, the maximum variations in the properties of the estersil products obtained is about as follows:

Specific surface area by nitrogen, m.²/g ----- 270 to 330
Percent carbon by analysis ------------------ 6.5 to 9.0
Specific hydroxylated surface area, $S_D$, by dye adsorption, m.²/g., less than 30

The foregoing limits represent characteristics of a preferred product of the invention.

*Example 6*

This illustrates the esterification of another siliceous substrate with various alcohols.

To make the substrate a silica heel sol was prepared by heating to 95° C. a solution of sodium silicate having an $SiO_2:Na_2O$ mole ratio of 3.36, and containing 3.64 grams of $SiO_2$ per 100 milliliters, and adding to ten volumes of this hot silicate solution 1 volume of a 2.9 N sulfuric acid solution over a period of one-half hour, at a uniform rate, and with vigorous agitation. The final $SiO_2$ concentration was 3.3% and 80% of the $Na_2O$ originally present in the sodium silicate solution was neutralized, i. e., the final $SO_3:Na_2O$ mol ratio was equal to 0.8. The $Na^+$ ion concentration was maintained at less than 0.4 N throughout the process and the final pH of the sol was about 10. In this manner an opalescent silica sol was prepared, the particles of which were about 15 millimicrons in diameter as determined from electron micrographs.

To this "heel" equal volumes of sodium silicate solution ($SiO_2:Na_2O$ mole ratio=3.36) and a sulfuric acid solution were added simultaneously but separately with vigorous agitation over a two hour period, while the temperature was maintained at 95° C. The concentration of the sodium silicate solution was about 6.6 grams of $SiO_2$ per 100 milliliters and a sufficient volume was added over the two hour period so that two parts of $SiO_2$ were added for each part of $SiO_2$ originally present in the "heel." The concentration of $SiO_2$ in the silica sol or slurry was maintained at 3.3 grams of $SiO_2$ per 100 milliliters throughout the preparation. The concentration of the sulfuric acid (0.52 N) was adjusted so that at all times the ratio of $SO_3$ to $Na_2O$ in the solution was 0.8, i. e., a pH of about 10 was maintained. The $Na^+$ ion concentration was maintained at less than 0.4 N throughout the process. Early in the "build-up" process the particles of silica present in the heel started to coalesce and precipitate. The final slurry was filtered, the wet filter cake was reslurried in water, and coagulated with 0.2% by weight (based on $SiO_2$) of a mixture of equimolar portions of cetyl and lauryl trimethylammonium bromide. The pH was adjusted to about 8 with 4 molar sulfuric acid, the reslurry was filtered, washed, and the cake was dried and the soft, pulverable product was powdered in a Raymond mill.

The dry powder consisted of coherent aggregates of coalesced ultimate dense units having an average unit diameter of 25 millimicrons as measured from electron micrographs and a specific surface area $S_c=94$ m.²/g. as calculated therefrom. The specific surface area as measured by nitrogen adsorption ($S_n$) was 97 m.²/g. and the specific hydroxylated surface area was 97 m.²/g. as measured by methyl red adsorption. Thus coalescence factor $$\frac{S_c}{S_n}$$

was 0.97. A slurry of 4 grams of the silica in 40 cc. of distilled water had a pH of 8.2. The following results were obtained upon chemical analysis: 89.54% $SiO_2$, 0.23% carbon, 1.20% sodium, 4.92% $H_2O$ by Fischer titration, 2.26% non-siliceous ash, and 8.25% loss on ignition. The bulk density of the dry powder was 0.160 g./cc. at 3 p. s. i.; 0.239 g./cc. at 78 p. s. i.; and 0.492 g./cc. at 1560 p. s. i. above atmospheric pressure.

This silica powder was further dried in vacuum at 70° C. for a period of 8 hours. To surface-esterify it, fifty grams of the silica was slurried in 500 cc. of n-butanol and the mixture was heated in an autoclave at 190° C. The autoclave was then cooled and the slurry was filtered. The butanol filtrate contained 0.32% water. The filter cake was dried in a vacuum oven at 75° C. for a period of about 48 hours.

The esterified product obtained had the following chemical analysis: Loss on ignition 8.01%; $SiO_2$ 89.44%; non-siliceous ash 2.56%; carbon 2.55%; hydrogen 1.02%. Thus, there were 0.036 butoxy groups per $SiO_2$ or 340 butoxy groups per 100 square millimicrons of substrate surface area. The specific hydroxylated surface area as calculated from dye adsorption was 4.8 m.²/g., a 95% reduction as a result of esterification.

A separate 25-gram sample of the dry silica powder, having a specific surface area of 98 m.²/g., was slurried in 300 cc. of normal propanol, and the mixture heated in an autoclave under autogenous pressure to 350° C., and then allowed to cool to room temperature. The resulting slurry was filtered and dried at 75° C. in a vacuum oven.

The dry, esterified product had a specific hydroxylated surface area of 8 m.²/g. as calculated from the adsorption of methyl red dye, a 92% decrease as the result of esterification. The product had the following chemical analysis: $SiO_2$, 84.56%; carbon 2.86%; hydrogen 0.95%; non-siliceous ash 6.43%; loss on ignition 9.02%. The product was organophilic and hydrophobic.

A separate twenty-five gram portion of the dry silica powder was slurried in 300 cc. of allyl alcohol and the mixture heated under autogenous pressure in an autoclave to 205° C. While the temperature was maintained at this point, the autoclave was vented to permit the alcohol to escape as a vapor. The esterified powder remaining in the bomb was dried at 75° C. in vacuum and was organophilic. The product had the following chemical analysis: $SiO_2$ 76.05%; loss on ignition 18.02%; non-siliceous ash 5.93%; carbon 8.12%; hydrogen 1.55%; bromine consumption 5.87 grams bromine per 100 grams of product. The specific hydroxylated surface area as calculated from the adsorption of methyl red dye was 8 m.²/g. Since each unsaturated group will take two bromine atoms, this data permits the calculation of unsaturated groups per unit surface area. This calculation gives 252 unsaturated groups per 100 square millimicrons of substrate surface area. Calculations based on the carbon content give higher values, which are considered less accurate, since they may reflect the presence of polymeric material which may have been formed from the allyl alcohol as a by-product under the conditions of the experiment.

A separate 10 gram portion of silica substrate, similarly prepared but having an ultimate particle diameter of 30 mμ was esterified by suspending it in 200 cc. of dicyclopentenyl alcohol and heating for one hour under autogenous pressure at 250° C. in an autoclave. The esterified product was filtered, washed with methyl ethyl ketone twice, and dried at 75° C. in vacuum for 48 hours. Tthe esterified product was an organophilic, hydrophobic white powder. The specified hydroxylated surface area as determined by methyl red dye adsorption was zero.

Another fifty gram portion of the silica substrate powder was esterified by suspending it in 500 cc. of "Geraniol" (a mixture of alcohols of the type 3,7-dimethyl-2,6 - octadiene - 1 - ol; $C_{10}H_{17}OH$) and heating for 1 hour under autogenous pressure at 250° C. in an autoclave. The product was filtered, washed three times by slurrying in methyl ethyl ketone and filtering each time. The filter cake was dried at 75° C. in a vacuum oven for about 65 hours. The esterified product was organophilic and hydrophobic. The specific hydroxylated surface area was zero.

A further one gram portion of the silica substrate powder was esterified by mixing it with 10 cc. of propargyl alcohol and heating to 110–137° C. for 6 hours in a sealed glass tube. The tube was cooled and opened, and the slurry filtered. The filter cake was washed by slurrying with acetone to remove the color resulting from the darkening of the alcohol during the heating cycle. The product was dried at 75° C. in a vacuum oven. It was organophilic. The specific hydroxylated surface area as determined by dye adsorption was 8 m.²/g.

A further twenty gram portion of the siliceous substrate was suspended in 500 cc. of cyclohexanol and the mixture was heated for one hour at 250° C. under autogenous pressure in an autoclave. The esterified product was filtered, washed with methyl ethyl ketone twice and dried at 75° C. in a vacuum oven for 48 hours. The dry esterified product was a free-flowing white powder which was organophilic and hydrophobic. The specific hydroxylated surface area was 9 m.²/g.

*Example 7*

This illustrates the use of still other alcohols for surface-esterifying siliceous substrates.

The silica substrate was prepared in the form of a wet cake by build-up from sodium silicate and sulfuric acid via a heel of silica sol as described for product 1 of Example 2. The cake was washed by reslurrying in acetone 3 times and filtering each time. Two hundred fifty grams of the acetone-washed cake (containing about 10% $H_2O$) was slurried in a 200 milliliter portion of Formula No. 3A, anhydrous, denatured ethanol and was then filtered. The slurrying in alcohol and filtration were repeated, and the filter cake was then suspended in 1,500 cc. of ethanol. The acetone and water were removed by fractional distillation. The slurry was placed in an autoclave and the substrate was surface-esterified by heating to 300° C. under pressure. The product was then cooled to room temperature, the suspension was filtered, and the filter cake was dried at 75° C. in a vacuum oven for a period of about 48 hours. The dry product was organophilic, hydrophobic and adsorbed no methyl red dye.

The foregoing procedure was repeated, substituting for the ethanol, in turn, each of the following alcohols as the esterifying agent:

Isopropanol
n-hexanol
n-butyl alcohol
n-octanol
isobutanol
2,2,4,trimethyl hexanol
technical stearyl alcohol ("Stenol")
technical lauryl alcohol ("Lorol")
branched chain octadecyl alcohol (5,7,7-trimethyl, 2-(1,3,3-trimethyl butyl) octane-1-ol)

With the last three alcohols listed above, the esterification procedure was modified somewhat from that described above for ethanol. In the case of technical stearyl alcohol the slurry obtained after autoclaving was filtered and the filter cake was then washed by reslurrying in hot methy ethyl ketone three times and filtering after each washing. The product was dried at 75° C. in a vacuum oven for 48 hours. With technical lauryl alcohol 1000 grams of the water-wet silica substrate filter cake was suspended in 3 liters of normal butanol and dehydrated by azeotropic distillation. The silica slurry in butanol was then filtered and the filter cake was reslurried in 1000 cc. of technical lauryl alcohol ("Lorol"). The remaining butanol was removed by fractional distillation. The suspension was then refluxed at atmospheric pressure for two hours at 228° C. to 230° C. The esterified product was then recovered as described above for stearyl alcohol. For the highly branched octadecyl alcohol the procedure employed for technical stearyl alcohol was used.

Example 8

This describes preparation of the type of product illustrated in Figure 5 of the drawings.

To make the substrate, a 2% aqueous dispersion of hectorite clay ("Wax Eyrite") was acidified to pH 2 by the addition of 3 N hydrochloric acid and kept at pH 2 for a period of 9 hours at room temperature. The clay was filtered, washed twice by resuspension in water and filtered, and was finally resuspended in water at a solids concentration of 1.4%. The pH was 5.45. The aqueous slurry was filtered and the clay transferred to anhydrous No. 3 denatured alcohol at about 3.4% solids.

The substrate in the resulting slurry was esterified in an autoclave by heating at 275–285° C. for 15 minutes, reaching a maximum pressure of 4,600 p. s. i. g., and then venting the solvent as a gas.

A very light, fluffy white solid remained in the autoclave. It was not hydrophobic, but was organophilic as shown by the fact that it migrated into the butanol layer when shaken with a mixture of n-butanol and water. Chemical analysis (after evacuation at 60° C. to remove any free solvents) showed that the product contained 74.42% $SiO_2$, 3.29% carbon, 1.22% hydrogen, and 15.22% non-siliceous ash, corresponding to a ratio of 1 $SiO_2$:0.11 ethoxy groups. The specific hydroxylated surface area of the acid-treated hectorite was 398 m.$^2$/g. and that of the esterified material 237 m.$^2$/g. as determined by the adsorption of methyl red dye, whereas the surface area of the acid-treated material as determined by nitrogen adsorption was 376 m.$^2$/g. Electron microscopic examination demonstrated that the acid-treated and esterified material contained ribbon-like particles an average of about 70 millimicrons wide and about 700 millimicrons long.

Example 9

This example shows the esterification of asbestos which had been acid-treated to produce surface-silanol groups thereon.

Chrysotile asbestos (No. 2 grade from Quebec, Canada) was put through a Wiley chopping mill to reduce the fiber length to an average of about ¼ inch. Four pounds of the dry fiber were mixed with 45 pounds of 1-inch porcelain balls and 80 pounds of water in a 25-gallon porcelain ball mill and were milled for 16 hours. The resulting suspension was filtered and ½ of the wet cake (containing 2 pounds of asbestos on a dry basis) was thoroughly mixed with 3 gallons of water and 36 pounds of C. P. 37% HCl in a glass-lined Pfaudler kettle and was heated with stirring for 16 hours at 80 to 92° C. The resulting suspension was filtered through filter cloth, and the filter cake was reslurried with 5 gallons of distilled water and again filtered. The filter cake was reslurried two additional times in five gallons of distilled water followed by filtration. The siliceous substrate was dried at about 110° C. over a period of 24 hours.

To esterify the dry, siliceous substrate it was slurried in 2 gallons n-butanol, heated to 225° C. in a 3-gallon steel autoclave, and cooled to well below 100° C. The total heating and cooling cycle required about 2.5 hours. The final slurry was filtered and the filter cake was dried at 120° C. and then put through a Raymond hammer mill to reduce it to a fine, light, fluffy powder.

The product was hydrophobic and organophilic. Chemical analysis showed it contained 85.6% $SiO_2$, 3.58% carbon, 1.43% hydrogen, 3.80% non-siliceous ash, and had a loss on ignition of 10.62%. The specific surface area of the esterified product was 125 m.$^2$/g. and the specific hydroxylated surface area was zero. Electron microscopic examination revealed that the average diameter of the fibers was about 25 to 30 millimicrons and the average length of the fibers was roughly 0.5 to 1 micron.

I claim:

1. An estersil, which is organophilic, being preferentially wetted by butanol in a butanol-water mixture, the estersil comprising a supercolloidal substrate coated with —OR groups, the substrate having a surface of silica and having a specific surface area of from 1 to 900 square meters per gram, the coating of —OR groups being chemically bound to said silica, R being a hydrocarbon radical of from 2 to 18 carbon atoms wherein the carbon atom attached to oxygen is also attached to hydrogen.

2. An hydrophobic estersil comprising a supercolloidal substrate coated with —OR groups, the substrate having a surface of silica and having a specific surface area of from 1 to 900 square meters per gram, the coating of —OR groups being chemically bound to said silica, R being a hydrocarbon radical of from 2 to 18 carbon atoms wherein the carbon atom attached to oxygen is also attached by hydrogen.

3. An estersil comprising a supercolloidal substrate coated with —OR groups, the substrate having a surface of silica and having a specific surface area of from 25 to 900 square meters per gram, there being in the —OR group coating, chemically bound to said silica, at least 100 —OR groups per 100 square millimicrons of substrate surface area, R being a hydrocarbon radical of from 2 to 18 carbon atoms wherein the carbon attached to oxygen is also attached to hydrogen.

4. An estersil comprising a supercolloidal substrate coated with —OR groups, the substrate having a surface of silica and having a specific surface area of from 25 to 900 square meters per gram, there being in the —OR group coating, chemically bound to said silica, at least 200 —OR groups per 100 square millimicrons of substrate surface area, R being a hydrocarbon radical of from 2 to 18 carbon atoms wherein the carbon attached to oxygen is also attached to hydrogen.

5. An estersil comprising a supercolloidal substrate coated with —OR groups, the substrate having a surface of silica and having a specific surface area of from 25 to 900 square meters per gram, there being in the —OR group coating, chemically bound to said silica, at least 270 —OR groups per 100 square millimicrons of substrate surface area and the coating being substantially impervious to methyl red dye, and the R of the —OR group being a hydrocarbon radical of from 2 to 18 carbon atoms wherein the carbon attached to oxygen is also attached to hydrogen.

6. An estersil comprising a supercolloidal substrate coated with alkoxy groups, the substrate having a surface of silica and having a specific surface area of from 25 to 900 square meters per gram, there being in the alkoxy group coating, chemically bound to said silica, at least 270 alkoxy groups per 100 square millimicrons of substrate surface area and the coating being substantially impervious to methyl red dye, and the alkyl radical of the alkoxy group being a hydrocarbon of from 2 to 18 carbon atoms wherein the carbon attached to oxygen is also attached to hydrogen.

7. An estersil, which is organophilic, being preferentially wetted by butanol in a butanol-water mixture, the estersil comprising a supercolloidal siliceous substrate coated with —OR groups, the substrate having a surface of silica and having a specific surface area of from 1 to 900 square meters per gram, the coating of —OR groups being chemically bound to said silica and R being a hydrocarbon radical of from 2 to 18 carbon atoms wherein the carbon atom attached to oxygen is also attached to hydrogen.

8. An estersil, which is organophilic, being preferentially wetted by butanol in a butanol-water mixture, the estersil comprising a supercolloidal substrate of amorphous silica coated with —OR groups, the substrate having a specific surface area of from 1 to 900 square meters per gram, the coating of —OR groups being chemically bound to said silica and R being a hydrocarbon radical of from 2 to 18 carbon atoms wherein the carbon atom attached to oxygen is also attached to hydrogen.

9. An estersil comprising a supercolloidal substrate of amorphous silica coated with —OR groups, the substrate having a specific surface area of from 1 to 900 meters per gram, there being in the —OR group coating, chemically bound to said silica, at least 200 —OR groups per 100 square millimicrons of substrate surface area, R being a hydrocarbon radical of from 2 to 18 carbon atoms wherein the carbon attached to oxygen is also attached to hydrogen.

10. An estersil comprising a supercolloidal substrate of amorphous silica coated with —OR groups, the substrate being in the form of aggregates of coherent, ultimate, non-porous spherical units of average diameter in the range of 5 to 100 millimicrons, the aggregates having an average pore diameter of at least 4 millimicrons and a specific surface area of from 25 to 900 square meters per gram, and there being in the —OR group coating, chemically bound to said silica, at least 200 —OR groups per 100 square millimicrons of substrate surface area, R being a hydrocarbon radical of from 2 to 18 carbon atoms wherein the carbon attached to oxygen is also attached to hydrogen.

11. An hydrophobic estersil comprising a supercolloidal substrate of amorphous silica coated with alkoxy groups, the substrate having an average pore diameter of at least 4 millimicrons and a specific surface area of from 200 to 900 square meters per gram, and the alkyl radical of the alkoxy group in the coating being a hydrocarbon radical of from 2 to 18 carbon atoms wherein the carbon attached to oxygen is also attached to hydrogen.

12. An estersil comprising a supercolloidal substrate of amorphous silica coated with alkoxy groups, the substrate being in the form of aggregates of coherent, non-porous, spherical, ultimate units of average diameter in the range of 5 to 15 millimicrons, the aggregates having an average pore diameter of at least 4 millimicrons and a specific surface area of about from 200 to 600 square meters per gram, and there being in the alkoxy group coating, chemically bound to said silica, at least 270 alkoxy groups per 100 square millimicrons of substrate surface area, the alkyl radical of the alkoxy groups being a hydrocarbon radical of from 3 to 6 carbon atoms wherein the carbon attached to oxygen is also attached to hydrogen.

13. An estersil comprising a supercolloidal substrate of amorphous silica coated with n-butoxy groups, the substrate being in the form of aggregates of coherent, non-porous, spherical ultimate units, the aggregates having an average pore diameter of at least 4 millimicrons, a specific surface area of about from 200 to 600 square meters per gram, and there being in the n-butoxy coating, chemically bound to said silica, at least 270 n-butoxy groups, per 100 square millimicrons of substrate surface area.

14. An estersil comprising a supercolloidal substrate of amorphous silica coated with butoxy groups, the substrate being in the form of aggregates of coherent, non-porous, spherical ultimate units, the estersil having a specific surface area, as determined by nitrogen adsorption, of about 270 to 330 square meters per gram, having butoxy groups, chemically bound to the substrate, equal to about 6.5 to 9.0 per cent carbon by chemical analysis, and having a specific hydroxylated surface area, as determined by methyl red dye adsorption, of less than about 30 square meters per gram.

15. In a process in which an inorganic substrate material in a supercolloidal state of subdivision, having a specific surface area of from 1 to 900 square meters per gram, and having a reactive silanol surface is esterified by chemical reaction with an alcohol of the formula ROH wherein R is a hydrocarbon radical having from 2 to 18 carbon atoms, wherein the carbon atom attached to oxygen is also attached to hydrogen, the step comprising heating the substrate with the alcohol at a temperature of at least 100° C. while maintaining the water content of the system below about 5% by weight of the alcohol in the system until the resulting product is organophilic, being preferentially wetted by butanol in a butanol-water mixture.

16. In a process in which an inorganic substrate material in a supercolloidal state of subdivision, having a specific surface area of from 1 to 900 square meters per gram, and having a reactive silanol surface is esterified by chemical reaction with an alcohol of the formula ROH wherein R is a hydrocarbon radical having from 2 to 18 carbon atoms, wherein the carbon atom attached to oxygen is also attached to hydrogen, the step comprising heating the substrate with the alcohol at a temperature of at least 118° C. while maintaining the water content of the system below about 3% by weight of the alcohol in the system until the resulting product is hydrophobic.

17. In a process in which an inorganic substrate material in a supercolloidal state of subdivision, having a specific surface area of from 1 to 900 square meters per gram, and having a reactive silanol surface is esterified chemically reacting an alcohol of the formula ROH wherein R is a hydrocarbon radical having from 2 to 18 carbon atoms, wherein the carbon atom attached to oxygen is also attached to hydrogen, the step comprising heating the substrate with the alcohol at a temperature of at least 190° C., while maintaining the water content of the system below about 1½% by weight of the alcohol in the system until the resulting product has a hydrophobic surface impenetrable to methyl red dye.

18. In a process in which an inorganic siliceous solid substrate in a supercolloidal state of subdivision, having a specific surface area of from 1 to 900 square meters per gram, and having a reactive silanol surface is esterified by chemically reacting an alcohol of the formula ROH in which R is a hydrocarbon radical having from 2 to 18 carbon atoms, wherein the carbon atom attached to oxygen is also attached to hydrogen, the step comprising heating the substrate with the alcohol while maintaining the water content of the system below about 5% by weight of the alcohol in the system until at least 100 —OR groups per 100 square millimicrons of surface area of said inorganic siliceous solid are chemically bound thereto.

RALPH K. ILER.

References Cited in the file of this patent

UNITED STATES PATENTS

| Number | Name | Date |
|---|---|---|
| 2,249,767 | Kistler | July 22, 1941 |
| 2,285,449 | Marshall | July 9, 1942 |
| 2,375,738 | White | May 8, 1945 |
| 2,395,550 | Iler | Feb. 26, 1946 |
| 2,395,880 | Kirk | Mar. 5, 1946 |
| 2,438,379 | Archibald | Mar. 23, 1948 |
| 2,438,520 | Robie | Mar. 30, 1948 |
| 2,454,941 | Pierce | Nov. 23, 1948 |
| 2,509,026 | White | May 23, 1950 |